United States Patent
Zhang et al.

(10) Patent No.: US 12,207,319 B2
(45) Date of Patent: Jan. 21, 2025

(54) HOTSPOT CONNECTION METHOD, TERMINAL DEVICE, AND ELECTRONIC DEVICE

(71) Applicant: Honor Device Co., Ltd., Shenzhen (CN)

(72) Inventors: Zhen Zhang, Shenzhen (CN); Fei Cen, Shenzhen (CN); Yongbao Yue, Shenzhen (CN); Xiaolong Ren, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/793,283

(22) PCT Filed: Jan. 20, 2022

(86) PCT No.: PCT/CN2022/072983
§ 371 (c)(1),
(2) Date: Jul. 15, 2022

(87) PCT Pub. No.: WO2022/257472
PCT Pub. Date: Dec. 15, 2022

(65) Prior Publication Data
US 2024/0179760 A1    May 30, 2024

(30) Foreign Application Priority Data
Jun. 10, 2021 (CN) .......................... 202110647215.2

(51) Int. Cl.
*H04W 88/04* (2009.01)
*H04M 1/72469* (2021.01)
(Continued)

(52) U.S. Cl.
CPC ....... *H04W 76/10* (2018.02); *H04M 1/72469* (2021.01); *H04W 12/065* (2021.01)

(58) Field of Classification Search
None
See application file for complete search history.

(56) References Cited

U.S. PATENT DOCUMENTS 10,602,462 B1 * 3/2020 Cheaz ................ H04W 52/343
2012/0240197 A1   9/2012 Tran et al.
(Continued)

FOREIGN PATENT DOCUMENTS

CN    105307235 A    2/2016
CN    105516026 A    4/2016
(Continued)

*Primary Examiner* — Ajit Patel
(74) *Attorney, Agent, or Firm* — Leydig, Voit & Mayer, Ltd.

(57) ABSTRACT

When successfully establishing a communication connection to an electronic device, the terminal device displays a first query pop-up window, to query a user whether to allow to open a hotspot to the electronic device. When receiving an instruction that allows to open the hotspot to the electronic device, the terminal device closes the first query pop-up window, and displays a second query pop-up window. The terminal device obtains a program indication set submitted by the user by using the second query pop-up window. A program indication is used to indicate a target program that is specified by the user to be disabled. The terminal device sends a processing instruction to the electronic device, to indicate the electronic device to connect to the hotspot after the electronic device disables all target programs indicated by the program indication set.

18 Claims, 24 Drawing Sheets

(51) Int. Cl.
*H04W 12/065* (2021.01)
*H04W 76/10* (2018.01)

(56) References Cited

U.S. PATENT DOCUMENTS

| | | | |
|---|---|---|---|
| 2014/0127992 A1* | 5/2014 | Kuscher | H04W 12/069 |
| | | | 455/41.1 |
| 2016/0007387 A1 | 1/2016 | Adib et al. | |
| 2016/0094662 A1* | 3/2016 | Kollu | H04L 43/0882 |
| | | | 709/224 |
| 2016/0295622 A1* | 10/2016 | Huang | H04W 24/10 |
| 2017/0223758 A1* | 8/2017 | Jung | H04W 4/80 |
| 2020/0204467 A1 | 6/2020 | Yu | |
| 2023/0050949 A1* | 2/2023 | Mo | H04W 76/10 |
| 2023/0359424 A1* | 11/2023 | Li | G06F 3/0481 |

FOREIGN PATENT DOCUMENTS

| | | | | |
|---|---|---|---|---|
| CN | 106068019 | A | 11/2016 | |
| CN | 106332225 | A | 1/2017 | |
| CN | 106559789 | A | 4/2017 | |
| CN | 106658358 | A | 5/2017 | |
| CN | 109151825 | A | 1/2019 | |
| CN | 110445924 | A | 11/2019 | |
| CN | 111050380 | A | 4/2020 | |
| CN | 111327458 | A | 6/2020 | |
| CN | 112243256 | A | 1/2021 | |
| EP | 4135470 | A1 * | 2/2023 | H04W 12/06 |
| WO | 2017223227 | A1 | 12/2017 | |
| WO | 2018010160 | A1 | 1/2018 | |

\* cited by examiner

HOTSPOT CONNECTION METHOD, TERMINAL DEVICE, AND ELECTRONIC DEVICE

CROSS-REFERENCE TO RELATED APPLICATIONS

This application is a National Stage of International Application No. PCT/CN2022/072983, filed on Jan. 20, 2022, which claims priority to Chinese Patent Application No. 202110647215.2, filed on Jun. 10, 2021, the disclosures of which are hereby incorporated by reference in their entireties.

TECHNICAL FIELD

The present disclosure relates to the field of communications technologies, and in particular, to a hotspot connection method, a terminal device, and an electronic device.

BACKGROUND

In some application scenarios, when an electronic device cannot connect to Wi-Fi, for example, when a user works with a notebook computer in an area in which Wi-Fi is not available, the electronic device may connect to a hotspot of a mobile phone to access a network. When the user enables a hotspot function, the mobile phone may convert a received signal such as GPRS, 3G, or 4G into hotspot Wi-Fi, and generate a hotspot Wi-Fi password, so that the user can connect to hotspot Wi-Fi on another electronic device for use.

When the electronic device connected to hotspot Wi-Fi accesses the network, the mobile phone that provides the hotspot consumes traffic. Some programs in the electronic device are automatically executed in a network connected state. For example, a system is automatically upgraded, an application automatically loads and plays a video, an advertisement is automatically pushed, or an attachment is automatically download. Such programs are automatically executed when it is detected that a hotspot Wi-Fi connection succeeds, and are not triggered to be executed based on a network access requirement of the user. Consequently, the mobile phone additionally consumes more traffic.

Currently, the electronic device may enable a connection mode of charging for traffic in a wireless network, so as to restrict traffic consumption after the electronic device connects to hotspot Wi-Fi. In this connection mode, the user may set a threshold of an upper limit for restricting traffic use. In this way, execution of a program whose traffic consumption exceeds the threshold is restricted. For example, if the user sets the threshold to 1G, but the system is to be automatically updated by using 3G data traffic, the system does not automatically perform program updating. However, because of a plurality of factors such as a network access requirement of the user, current available traffic of the mobile phone, and data traffic consumed during execution of each program, the user often needs to adaptively adjust the threshold for different scenarios, causing much inconvenience in using hotspot Wi-Fi.

SUMMARY

To resolve the problem in the background, the present disclosure provides a hotspot connection method, a terminal device, and an electronic device. After the terminal device establishes a connection to the electronic device, if a terminal user agrees to open a hotspot to the electronic device and disables a program that is automatically executed when the electronic device is connected to a network, the electronic device switches to a trigger traffic application mode and then connects to the hotspot Wi-Fi. The automatic program that is specified by the terminal to be disabled is not actively executed. This reduces traffic consumption of the terminal device.

An embodiment of a first aspect provides a hotspot connection method. The method is applied to a terminal device, and includes:

The terminal device establishes a communication connection to an electronic device.

When the connection to the electronic device succeeds, the terminal device displays a first query pop-up window. The first query pop-up window is used to query a user whether to allow to open a hotspot to the electronic device.

When receiving an instruction that allows to open the hotspot to the electronic device, the terminal device closes the first query pop-up window, and displays a second query pop-up window. The second query pop-up window is used to query the user whether to disable an automatic program, and the automatic program is a program that is automatically executed by the electronic device in a network connected state.

The terminal device obtains a program indication set submitted by the user by using the second query pop-up window. A program indication in the program indication set is used to indicate, to the electronic device, a target program that is specified by the user to be disabled.

The terminal device sends a processing instruction to the electronic device. The processing instruction is used to indicate the electronic device to connect to the hotspot after the electronic device disables all target programs indicated by the program indication set.

In the first aspect, when establishing the communication connection to the electronic device, the terminal device triggers a terminal query mechanism by using the first query pop-up window to query whether to provide a hotspot service for the electronic device and by using the second query pop-up window to query whether to disable a program that automatically starts execution when an end of the electronic device accesses the network. This helps the user decide, based on factors such as remaining traffic of the terminal device and an application scenario of the electronic device, whether to restrict automatic execution of a traffic consumption program of the end of the electronic device. Then, the terminal device delivers the processing instruction to the electronic device, to indicate the end of the electronic device to first disable, according to the processing instruction, the target program specified by the terminal user, and then connect to the hotspot based on an obtained Wi-Fi password of the hotspot. Therefore, a trigger traffic use mode can be implemented, so that the end of the electronic device is more adaptable to a terminal traffic status when using the hotspot. This avoids excessive terminal traffic consumption, ensures that the electronic device can normally perform network access, and improves user experience.

In a first example implementation of the first aspect, that the terminal device sends a processing instruction to the electronic device includes: When detecting that the program indication set is a non-empty set, the terminal device generates and sends a first processing instruction to the electronic device based on the program indication set. The first processing instruction is used to indicate the electronic device to request to obtain a Wi-Fi password of the hotspot from the terminal device after the electronic device disables all the target programs indicated by the program indication set.

In this implementation, after obtaining the program indication set, the terminal device directly detects at a local end whether the program indication set is an empty set, and delivers a corresponding processing instruction based on a detection result. If the program indication set is a non-empty set, the terminal device sends the first processing instruction to the electronic device. In response to the first processing instruction, the electronic device disables all the target programs indicated by the program indication set, to ensure that the target programs are not automatically enabled after hotspot access. Therefore, a trigger traffic use mode is implemented. After disabling all the target programs, the electronic device requests to obtain the Wi-Fi password of the hotspot from the terminal device, and automatically connects to the hotspot after obtaining the Wi-Fi password.

In a second example implementation of the first aspect, that the terminal device sends a processing instruction to the electronic device includes: When detecting that the program indication set is an empty set, the terminal device sends a second processing instruction to the electronic device. The second processing instruction carries a Wi-Fi password of the hotspot, and is used to indicate the electronic device to automatically connect to the hotspot by using the Wi-Fi password. In this implementation, when the program indication set is an empty set, the terminal device needs to deliver another type of processing instruction, that is, the second processing instruction. Therefore, in response to the second processing instruction, the end of the electronic device directly connects to the hotspot by using the Wi-Fi password, and does not need to disable any automatic program at a local end. In other words, after assessing the hotspot, the electronic device still remains in a scenario state of automatically starting execution of an automatic program.

In a third example implementation of the first aspect, that the terminal device sends a processing instruction to the electronic device includes: sending a third processing instruction to the electronic device. The third processing instruction carries a Wi-Fi password of the hotspot and the program indication set, and is used to indicate the electronic device to automatically connect to the hotspot based on the Wi-Fi password after the electronic device disables all the target programs indicated by the program indication set.

In this implementation, the end of the electronic device instead of the terminal device may detect whether the program indication set is an empty set. After receiving the third processing instruction from the terminal device, the electronic device first detects whether the program indication set is an empty set, and executes matched hotspot connection processing logic based on a detection result. Further, if the program indication set is an empty set, the electronic device maintains a current normal traffic use mode, in other words, does not need to disable any automatic program, and directly accesses the hotspot based on the Wi-Fi password. If the program indication set is a non-empty set, the electronic device first disables all the target programs indicated by the program indication set, and then accesses the terminal hotspot. Therefore, a trigger traffic use mode can be implemented, so that the end of the electronic device is more adaptable to a terminal traffic status when using the hotspot. This avoids excessive terminal traffic consumption, ensures that the electronic device can normally perform network access, and improves user experience.

With reference to the first example implementation of the first aspect, in a fourth example implementation of the first aspect, the method further includes: The terminal device receives program disabled information that is sent by the electronic device in response to the first processing instruction; the terminal device controls enabling of a hotspot function; and the terminal device sends the Wi-Fi password of the hotspot to the electronic device, so that the electronic device connects to the hotspot. In this implementation, the end of the electronic device first disables a target program, and then an end of the terminal device opens the hotspot and shares the Wi-Fi password, so as to avoid a case in which the end of the electronic device accesses the hotspot when the target program is not completely disabled. Therefore, after the end of the electronic device accesses the hotspot, unless the user actively triggers the target program, the target program is not actively executed and terminal traffic is not actively consumed.

With reference to the second or the third example implementation of the first aspect, in a fifth example implementation of the first aspect, the method further includes: after sending the processing instruction to the electronic device, controlling enabling of a hotspot function. In this implementation, if the terminal device sends the second processing instruction to the electronic device, it indicates that the user does not restrict execution of any automatic program at the end of the electronic device. Therefore, after delivering the second processing instruction, the terminal device may directly enable the hotspot function. If the terminal device sends the third processing instruction to the display device, after responding to the third processing instruction, the end of the electronic device does not directly connect to the hotspot, but needs to first detect whether the program indication set is an empty set, and then executes corresponding processing logic based on a detection result. Therefore, after the terminal device delivers the third processing instruction, the terminal device may also directly enable the hotspot function, and a case in which the target program is not disabled does not need to be concerned after the electronic device accesses the hotspot.

In a sixth example implementation of the first aspect, before displaying the second query pop-up window; the terminal device sends first indication information to the electronic device. The first indication information is used to indicate the electronic device to feed back a program list, and the program list includes program identifiers of all automatic programs that each are in an enabled state currently in the electronic device. The terminal device receives the program list from the electronic device. The terminal device generates the second query pop-up window based on the program list. The second query pop-up window is used to enable the user to select no target program or select at least one target program from the program list, so that the program indication set obtained by the terminal device is an empty set or is a non-empty subset of the program list. In this implementation, the program list is displayed in the second query pop-up window, so that the terminal user can clearly learn of a program that consumes traffic to automatically start execution after the end of the electronic device accesses the hotspot. Therefore, the terminal user selects not to disable an automatic program or selects to disable some or all of the automatic programs based on factors such as local-end remaining traffic and an automatic program usage requirement.

In a seventh example implementation of the first aspect, the second query pop-up window displays information used to query the user whether to disable all automatic programs that each are in an enabled state currently in the electronic device, an acknowledgment control, and a cancel control.

The acknowledgment control is configured to enable the program indication set obtained by the terminal device to be a universal set of a program list when being triggered, the program list includes program identifiers of all the automatic programs that each are in an enabled state currently in the electronic device, and the cancel control is configured to enable the program indication set obtained by the terminal device to be an empty set when being triggered. In this implementation, through information querying in the second query pop-up window; all the automatic programs that each are in an enabled state at the end of the electronic device are quickly disabled at once by triggering the acknowledgment control instead of selecting a target program by the terminal user. If the terminal user wants to remain in a scenario state of automatically executing each automatic program after the end of the electronic device accesses the hotspot, the user only needs to trigger the cancel control, which is more convenient and fast.

In an eighth example implementation of the first aspect, after the terminal device displays the first query pop-up window; if the terminal device does not receive, within a time threshold, the instruction that allows to open the hotspot to the electronic device, the terminal device closes only the first query pop-up window; and does not display the second query pop-up window. After displaying the first query pop-up window; considering that the user may enter an instruction of disallowing to open the hotspot to the electronic device or instruction input times out, the terminal device automatically closes the first query pop-up window; and does not display the second query pop-up window. This ensures accuracy of a UI operation procedure.

An embodiment of a second aspect provides a hotspot connection method. The method is applied to an electronic device, and includes:

The electronic device establishes a communication connection to a terminal device.

After the connection to the terminal device succeeds, the electronic device receives a processing instruction from the terminal device.

The electronic device identifies a category of the processing instruction.

If the electronic device identifies that the processing instruction belongs to a target category, in response to the processing instruction, the electronic device disables all target programs indicated by a program indication set in the processing instruction, and then connects to a hotspot. The processing instruction of the target category includes the program indication set, a program indication in the program indication set is used to indicate a target program to the electronic device, the target program is an automatic program that is specified by a terminal user to be disabled, and the automatic program is a program that is automatically executed by the electronic device in a network connected state.

In the second aspect, the processing instruction is one of the first processing instruction, the second processing instruction, and the third processing instruction described above. After receiving the processing instruction, the electronic device first identifies the category of the processing instruction. Both the first processing instruction and the third processing instruction belong to the target category, and the second processing instruction belongs to a non-target category. The electronic device executes corresponding processing logic according to the processing instruction of the target category that is delivered by the terminal, so as to ensure that the electronic device accesses the hotspot after the target program is completely disabled. Therefore, a trigger traffic use mode can be implemented, so that an end of the electronic device is more adaptable to a terminal traffic status when using the hotspot. This avoids excessive terminal traffic consumption, ensures that the electronic device can normally perform network access, and improves user experience.

In a first example implementation of the second aspect, if the electronic device identifies that the processing instruction belongs to the target category, in response to the processing instruction, the disabling all target programs indicated by a program indication set in the processing instruction, and then connecting to a hotspot includes: If the electronic device identifies that the processing instruction is a first processing instruction, the electronic device disables all the target programs indicated by the program indication set. The electronic device sends program disabled information to the terminal device. The program disabled information is used to notify the terminal device that all the target programs are disabled, and request a Wi-Fi password of the hotspot. The electronic device receives the Wi-Fi password from the terminal device, and automatically connects to the hotspot by using the Wi-Fi password. The first processing instruction is a processing instruction that is sent by the terminal device when the terminal device receives an instruction that allows to open the hotspot to the electronic device, obtains the program indication set submitted by the terminal user, and detects that the program indication set is a non-empty set.

In a second example implementation of the second aspect, if the electronic device identifies that the processing instruction belongs to the target category, in response to the processing instruction, the disabling all target programs indicated by a program indication set in the processing instruction, and then connecting to a hotspot includes: If the electronic device identifies that the processing instruction is a third processing instruction, the electronic device detects whether the program indication set is an empty set. The third processing instruction further includes a Wi-Fi password of the hotspot. If the electronic device detects that the program indication set is a non-empty set, the electronic device disables all the target programs indicated by the program indication set, and then automatically connects to the hotspot by using the Wi-Fi password; or if the electronic device detects that the program indication set is an empty set, the electronic device automatically connects to the hotspot based on the Wi-Fi password without disabling any automatic program.

In a third example implementation of the second aspect, the method further includes: If the electronic device identifies that the processing instruction is a second processing instruction of a non-target category, the electronic device automatically connects to the hotspot based on a Wi-Fi password carried in the second processing instruction without disabling any automatic program. The second processing instruction is a processing instruction that is sent by the terminal device when the terminal device receives an instruction that allows to open the hotspot to the electronic device, obtains the program indication set submitted by the terminal user, and detects that the program indication set is an empty set.

In a fourth example implementation of the second aspect, before the electronic device receives the processing instruction from the terminal device, the method further includes: When receiving first indication information from the terminal device, the electronic device sends an obtained program list to the terminal device. The program list includes program identifiers of all automatic programs that each are in an enabled state currently in the electronic device, and the program list is used to enable the terminal user to select the target program. In this implementation, the electronic device receives first indication information, and then may send a program list maintained or obtained at a local end to the terminal device, so that a second query pop-up window generated by the terminal device incorporates the program list. This helps the user select the target program from the program list, to form the program indication set and confirm to submit the program indication set that meets an actual scenario requirement.

An embodiment of a third aspect provides a terminal device, including a first connection unit, a display unit, a set obtaining unit, and a processing and transceiver unit.

The first connection unit is configured to establish a communication connection between the terminal device and an electronic device.

The display unit is configured to: when the connection between the terminal device and the electronic device succeeds, display a first query pop-up window. The first query pop-up window is used to query a user whether to allow to open a hotspot to the electronic device.

The display unit is further configured to: when receiving an instruction that allows to open the hotspot to the electronic device, close the first query pop-up window; and display a second query pop-up window. The second query pop-up window is used to query the user whether to disable an automatic program, and the automatic program is a program that is automatically executed by the electronic device in a network connected state.

The set obtaining unit is configured to obtain a program indication set submitted by the user by using the second query pop-up window. A program indication in the program indication set is used to indicate, to the electronic device, a target program that is specified by the user to be disabled.

The processing and transceiver unit is configured to send a processing instruction to the electronic device. The processing instruction is used to indicate the electronic device to connect to the hotspot after the electronic device disables all target programs indicated by the program indication set.

In a first example implementation of the third aspect, the processing and transceiver unit is specifically configured to: when detecting that the program indication set is a non-empty set, generate and send a first processing instruction to the electronic device based on the program indication set. The first processing instruction is used to indicate the electronic device to request to obtain a Wi-Fi password of the hotspot from the terminal device after the electronic device disables all the target programs indicated by the program indication set.

In a second example implementation of the third aspect, the processing and transceiver unit is specifically configured to: when detecting that the program indication set is an empty set, send a second processing instruction to the electronic device. The second processing instruction carries a Wi-Fi password of the hotspot, and is used to indicate the electronic device to automatically connect to the hotspot by using the Wi-Fi password.

In a third example implementation of the third aspect, the processing and transceiver unit is specifically configured to send a third processing instruction to the electronic device. The third processing instruction carries a Wi-Fi password of the hotspot and the program indication set, and is used to indicate the electronic device to automatically connect to the hotspot based on the Wi-Fi password after the electronic device disables all the target programs indicated by the program indication set.

With reference to the first example implementation of the third aspect, in a fourth example implementation of the third aspect, the processing and transceiver unit is further configured to: receive program disabled information that is sent by the electronic device in response to the first processing instruction; control enabling of a hotspot function; and send the Wi-Fi password of the hotspot to the electronic device, so that the electronic device connects to the hotspot.

With reference to the second or the third example implementation of the third aspect, in a fifth example implementation of the third aspect, the processing and transceiver unit is further configured to: after sending the processing instruction to the electronic device, control enabling of a hotspot function.

In a sixth example implementation of the third aspect, the processing and transceiver unit is further configured to: before the display unit displays the second query pop-up window; send first indication information to the electronic device, where the first indication information is used to indicate the electronic device to feed back a program list, and the program list includes program identifiers of all automatic programs that each are in an enabled state currently in the electronic device; receive the program list from the electronic device; and generate the second query pop-up window based on the program list, where the second query pop-up window is used to enable the user to select no target program or select at least one target program from the program list, so that the program indication set obtained by the terminal device is an empty set or is a non-empty subset of the program list.

In a seventh example implementation of the third aspect, the display unit is further configured to display, in the second query pop-up window; information used to query the user whether to disable all automatic programs that each are in an enabled state currently in the electronic device, an acknowledgment control, and a cancel control. The acknowledgment control is configured to enable the program indication set obtained by the terminal device to be a universal set of a program list when being triggered, the program list includes program identifiers of all the automatic programs that each are in an enabled state currently in the electronic device, and the cancel control is configured to enable the program indication set obtained by the terminal device to be an empty set when being triggered.

In an eighth example implementation of the third aspect, the display unit is further configured to: after displaying the first query pop-up window, if the terminal device does not receive, within a time threshold, the instruction that allows to open the hotspot to the electronic device, close only the first query pop-up window; and skip displaying the second query pop-up window.

An embodiment of a fourth aspect provides an electronic device, including:
  a second connection unit, configured to establish a communication connection between the electronic device and a terminal device;
  a transceiver unit, configured to: after the connection between the electronic device and the terminal device succeeds, receive a processing instruction from the terminal device; and
  a processing unit, configured to identify a category of the processing instruction.

The processing unit is further configured to: if the processing unit identifies that the processing instruction belongs to a target category, in response to the processing instruction, disable all target programs indicated by a program indication set in the processing instruction, and then connect to a hotspot. The processing instruction of the target category includes the program indication set, a program indication in the program indication set is used to indicate a target program to the electronic device, the target program is an automatic program that is specified by a terminal user to be disabled, and the automatic program is a program that is automatically executed by the electronic device in a network connected state.

In a first example implementation of the fourth aspect, the processing unit is specifically configured to: if the processing unit identifies that the processing instruction is a first processing instruction, disable all the target programs indicated by the program indication set; send program disabled information to the terminal device, where the program disabled information is used to notify the terminal device that all the target programs are disabled, and request a Wi-Fi password of the hotspot; and receive the Wi-Fi password from the terminal device, and automatically connect to the hotspot by using the Wi-Fi password. The first processing instruction is a processing instruction that is sent by the terminal device when the terminal device receives an instruction that allows to open the hotspot to the electronic device, obtains the program indication set submitted by the terminal user, and detects that the program indication set is a non-empty set.

In a second example implementation of the fourth aspect, the processing unit is specifically configured to: if the processing unit identifies that the processing instruction is a third processing instruction, detect whether the program indication set is an empty set, where the third processing instruction further includes a Wi-Fi password of the hotspot; and if the processing unit detects that the program indication set is a non-empty set, disable all the target programs indicated by the program indication set, and then automatically connect to the hotspot by using the Wi-Fi password; or if the processing unit detects that the program indication set is an empty set, automatically connect to the hotspot by using the Wi-Fi password, and skip disabling any automatic program.

In a third example implementation of the fourth aspect, the processing unit is further configured to: if the processing unit identifies that the processing instruction is a second processing instruction of a non-target category, automatically connect to the hotspot based on a Wi-Fi password carried in the second processing instruction, and skip disabling any automatic program. The second processing instruction is a processing instruction that is sent by the terminal device when the terminal device receives an instruction that allows to open the hotspot to the electronic device, obtains the program indication set submitted by the terminal user, and detects that the program indication set is an empty set.

In a fourth example implementation of the fourth aspect, the transceiver unit is further configured to: before receiving the processing instruction from the terminal device, when receiving first indication information from the terminal device, send an obtained program list to the terminal device. The program list includes program identifiers of all automatic programs that each are in an enabled state currently in the electronic device, and the program list is used to enable the terminal user to select the target program.

An embodiment of a fifth aspect provides a terminal device, including a memory and at least one processor. The memory is configured to store instructions. The at least one processor is configured to execute the instructions in the memory to perform the hotspot connection method according to any one of the example implementations of the first aspect.

An embodiment of a sixth aspect provides an electronic device, including a memory and at least one processor. The memory is configured to store instructions. The at least one processor is configured to execute the instructions in the memory to perform the hotspot connection method according to any one of the example implementations of the second aspect.

An embodiment of a seventh aspect provides a computer-readable storage medium, including instructions. When the instructions are run on a computer, the computer is enabled to perform the hotspot connection method according to any one of the example implementations of the first aspect.

An embodiment of an eighth aspect provides a computer-readable storage medium, including instructions. When the instructions are run on a computer, the computer is enabled to perform the hotspot connection method according to any one of the example implementations of the second aspect.

According to a ninth aspect, an embodiment of this application further provides a chip system. The chip system includes a processor and a memory. The memory stores program instructions. When the program instructions are executed by the processor, the chip system is enabled to perform the methods in the foregoing aspects and the implementations of the foregoing aspects, for example, generate or process information involved in the foregoing methods.

According to a tenth aspect, an embodiment of this application further provides a computer program product. When the computer program product runs on a computer, the computer is enabled to perform the methods in the foregoing aspects and the implementations of the foregoing aspects.

BRIEF DESCRIPTION OF DRAWINGS

To describe technical solutions in embodiments of the present disclosure or the conventional technology more clearly, the following briefly describes the accompanying drawings required for describing embodiments. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

To make objectives, implementations, and advantages of this application clearer, the following clearly and completely describes example implementations of this application with reference to the accompanying drawings in example embodiments of this application. Apparently, the described example embodiments are merely some rather than all of embodiments of this application.

Terms "first", "second", "third", "fourth", and the like (if exist) in this specification and the claims of the present disclosure and the foregoing accompanying drawings are used to distinguish between similar objects without being used to describe a specific order or sequence. It should be understood that the data used in this way is interchangeable in appropriate cases, so that embodiments described herein can be implemented in a sequence other than the content shown or described herein. In addition, terms "include" and "have" and any modifications thereof are intended to cover non-exclusive inclusion. For example, processes, methods, systems, products, or devices including a series of steps or units are not necessarily limited to those steps or units that are clearly listed, but may include other steps or units that are not clearly listed or are inherent to these processes, methods, products, or devices.

Figure 1:
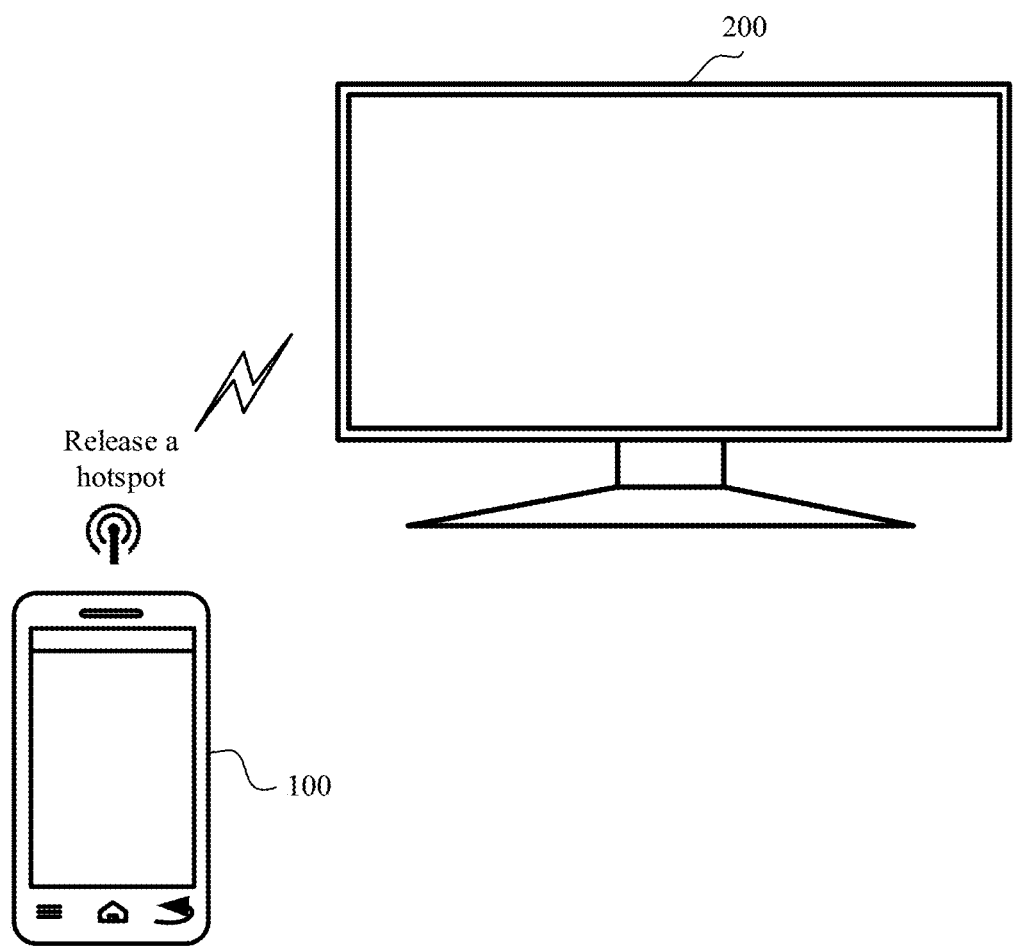
FIG. 1 is a schematic diagram of an example of an application scenario.

An application scenario shown in FIG. 1 includes a terminal device 100 and an electronic device 200. The terminal device 100 is a smartphone. The electronic device 200 includes but is not limited to a smartphone, a smart band, a tablet computer, a notebook computer, a desktop computer, and the like. The terminal device 100 is an end that releases a hotspot and provides hotspot Wi-Fi. The electronic device is an end that uses hotspot Wi-Fi.

Figure 2:
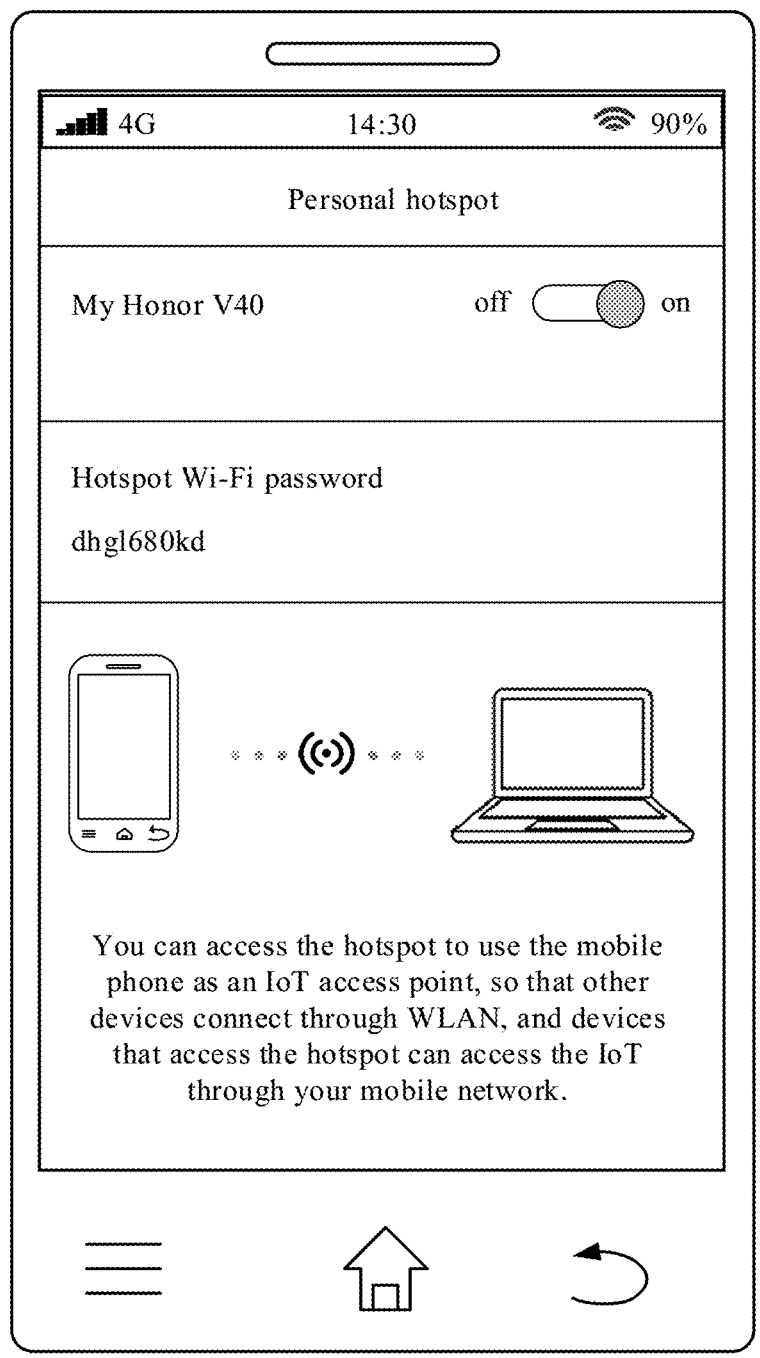
FIG. 2 is a schematic diagram of an example in which a terminal device displays a personal hotspot page.

FIG. 2 shows a personal hotspot page at an end of the terminal device 100. A switch control of a personal hotspot is disposed on the page. A user may operate the switch control to switch a switch status of a hotspot function. Information such as a hotspot Wi-Fi password is further displayed on the page. After enabling the hotspot function, the terminal device 100 releases hotspot Wi-Fi within a specific area range of the scenario. The user selects to access a network on the electronic device 200 in a wireless local area network mode, then selects a Wi-Fi name of the hotspot that is released by the terminal device 100, and enters an obtained Wi-Fi password. After hotspot Wi-Fi is successfully connected, the user can access the network at an end of the electronic device 200.

During actual application, after the electronic device 200 successfully connects to hotspot Wi-Fi, when detecting that the electronic device is currently in a network connected state, some system programs or applications automatically start execution, for example, automatic system upgrade, automatic application update, automatic advertisement load, automatic video play, or automatic attachment download. Such programs automatically start execution in a network connected state, instead of starting execution in response to user trigger. In addition, a data volume requested to be downloaded during execution of such programs is usually very large. For example, automatic system upgrade may consume dozens of G. In this case, traffic of the terminal device 100 is severely consumed. If charging is performed based on a traffic package, problems such as a tariff increase and frequent arrears of the terminal device 100 are likely to occur.

Currently, a traffic threshold is set to restrict data usage of the electronic device 200, and the user needs to set proper thresholds in different application scenarios. For example, when a package of the terminal device 100 of the user includes sufficient traffic, a traffic threshold at the end of the electronic device 200 is set to be relatively large. When remaining traffic of the terminal device 100 is insufficient, but the electronic device 200 needs to use the terminal hotspot, the user can only reduce the traffic threshold. In this manner, hotspot Wi-Fi is inconvenient for the user to use.

Therefore, the objective of this application is as follows: After the terminal device 100 establishes a communication connection to the electronic device 200, the user is queried at the end of the terminal device 100 whether to agree to provide hotspot Wi-Fi for the electronic device 200. If yes, it is further queried whether some or all of automatic programs at the end of the electronic device 200 need to be disabled, and corresponding processing logic is executed based on a user selection operation. A manner of establishing a communication connection between the terminal device 100 and the electronic device 200 is not limited.

In an example implementation, if the terminal device 100 has a near field communication (NFC) function, the two-end devices may establish an NFC connection. When the terminal device needs to provide the hotspot, the terminal device needs to enable the NFC function, and an NFC sensing area of the terminal device is placed by the user to be close to and align with an NFC tag of the electronic device. After the NFC sensing area responds, the NFC tag is successfully written. In this case, the connection is completed.

Figure 6:
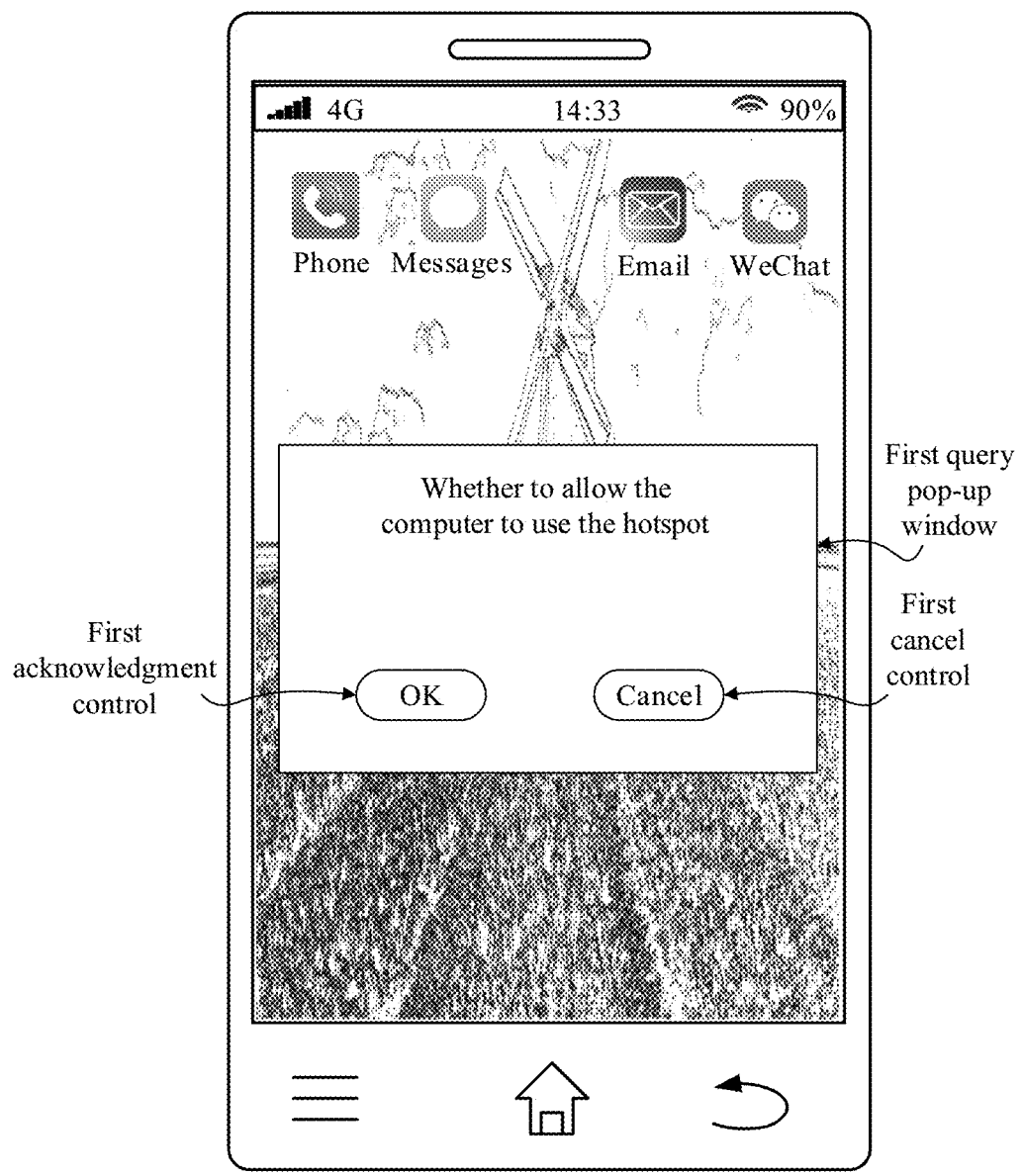
FIG. 6 is a schematic diagram of an example in which a terminal device displays a first query pop-up window.

In an example implementation, when detecting that the NFC connection succeeds, the terminal device 100 displays a first query pop-up window shown in FIG. 6 on a UI interface.

Figure 3:
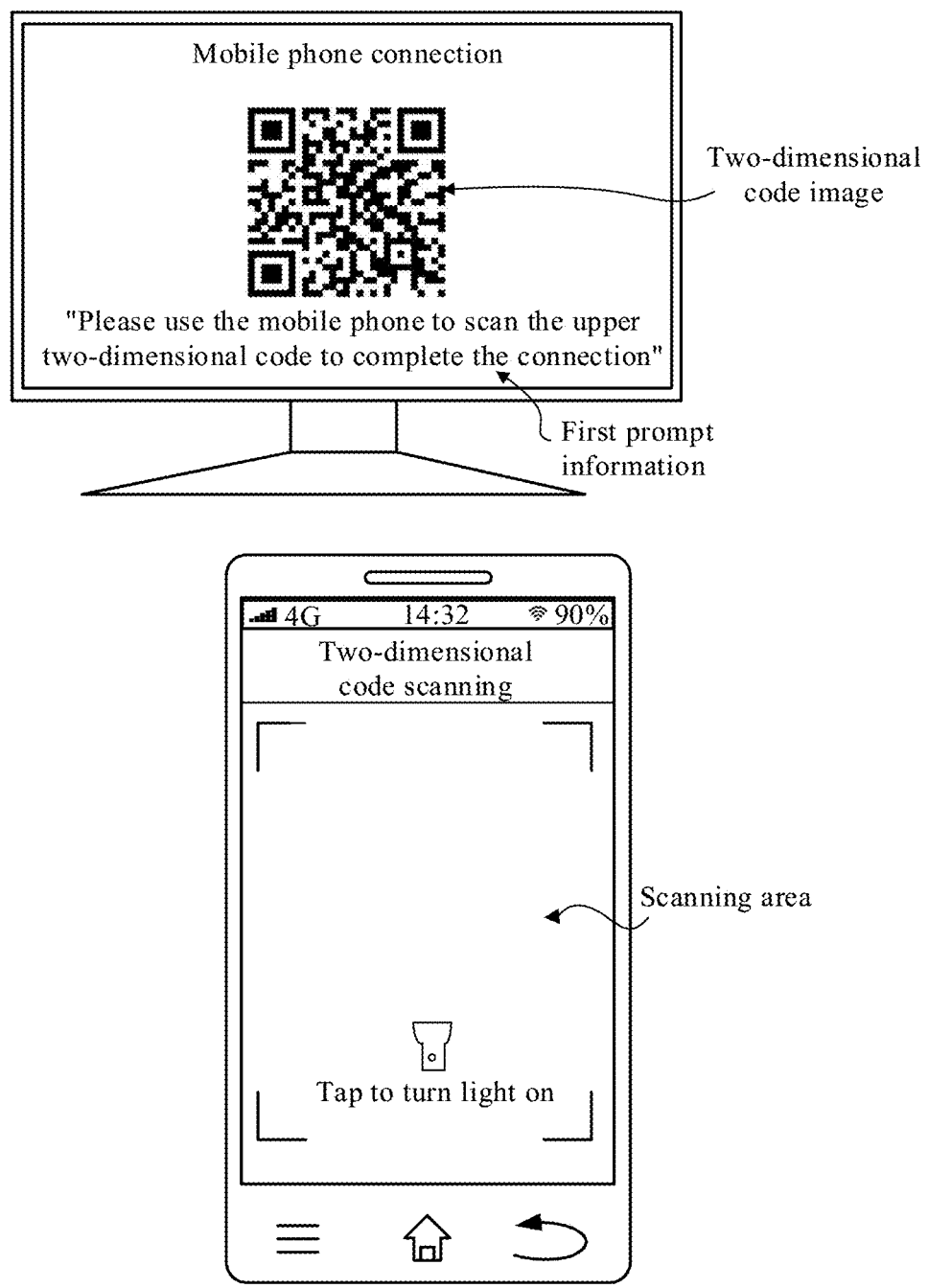
FIG. 3 is a schematic diagram of an example in which an electronic device displays a mobile phone connection page.

In an example implementation, a solution is further provided for a code scanning connection between the terminal device 100 and the electronic device 200, a communications protocol for the code scanning connection needs to be preset in the terminal device 100 and the electronic device 200, and a target application with the communications protocol may be configured in the electronic device 200, for example, Computer Manager or Phone Assistant. A computer manager application installed on the electronic device 200 is used as an example. After starting the computer manager application, a mobile phone connection option is selected to enter a mobile phone connection page shown in FIG. 3 as an example. The mobile phone connection page generates and displays a two-dimensional code image, and may further display first prompt information used to prompt the user to connect to the terminal through code scanning. After viewing the first prompt information, the user may scan the two-dimensional code image on a code scanning page by using a two-dimensional code scanning entry of the terminal device or an application having a code scanning function. After the electronic device 200 receives a code scanning complete message from the terminal device 100, the electronic device 200 successfully connects to the terminal device 100.

Figure 4:
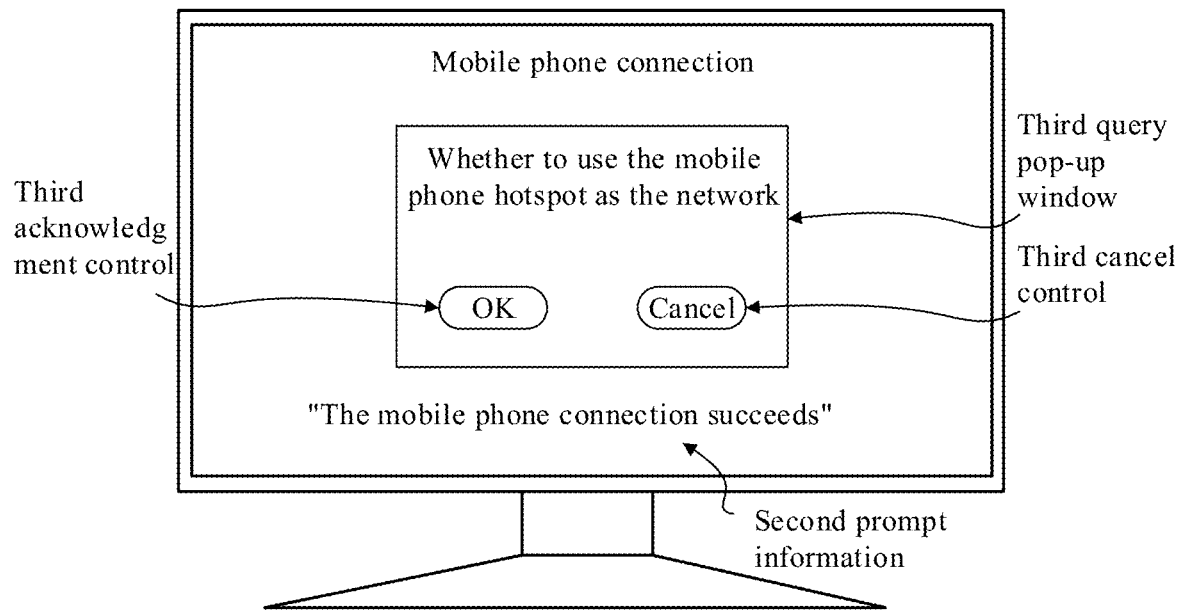
FIG. 4 is a schematic diagram A of an example of a UI change generated after an electronic device successfully connects to a mobile phone.

In an example implementation, after the terminal device 100 successfully connects to the electronic device 200 through code scanning, a UI is shown in FIG. 4, to be specific, the mobile phone connection page cancels display of the first prompt information and the two-dimensional code image, and displays a third query pop-up window and second prompt information indicating that the terminal device successfully connects to the electronic device. The third query pop-up window is used to query whether the user uses the hotspot of the mobile phone as a network. The third query pop-up window is further provided with a third acknowledgment control and a third cancel control. If the electronic device 200 receives a tap operation performed by the user on the third acknowledgment control, the electronic device sends a hotspot request to the terminal device 100. In response to the hotspot request, the terminal device 100 displays the first query pop-up window shown in FIG. 6 on the UI interface. If the electronic device 200 receives a tap operation performed by the user on the third cancel control, the electronic device does not send the hotspot request to the terminal device 100 and closes the third query pop-up window, and the electronic device 200 and the terminal device 100 each maintain a current state. Display of the second prompt information may be canceled when a display time reaches preset duration.

Figure 5:
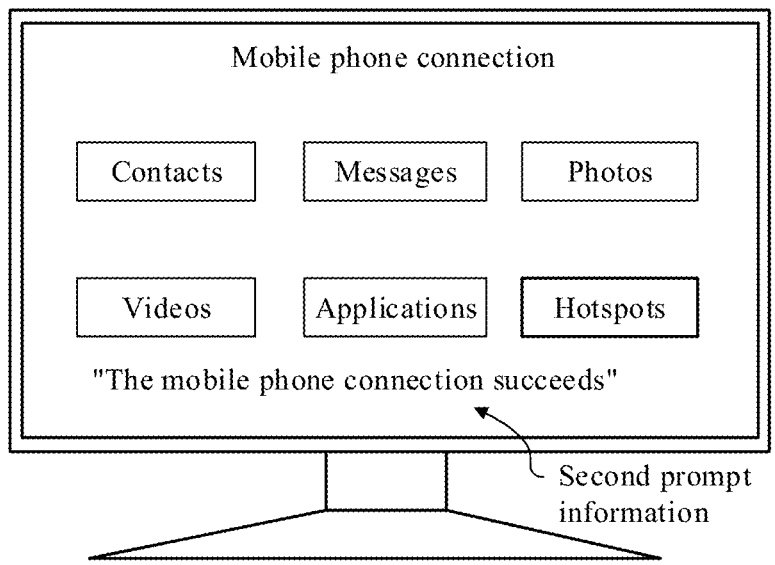
FIG. 5 is a schematic diagram B of an example of a UI change generated after an electronic device successfully connects to a mobile phone.

In an example implementation, after the terminal device 100 successfully connects to the electronic device 200 through code scanning, a UI is shown in FIG. 5, to be specific, the mobile phone connection page cancels display of the first prompt information and the two-dimensional code image, and displays the second prompt information and related function options such as Contacts, Messages, Photos, Videos, Audio, Applications, and Hotspot. After the user selects Hotspot, the hotspot of the mobile phone may be set as a network. In this case, the electronic device 200 sends the hotspot request to the terminal device 100. In response to the hotspot request, the terminal device 100 displays the first query pop-up window shown in FIG. 6 on the UI interface. It should be noted that a manner in which the electronic device 200 sets the hotspot of the mobile phone as a network is not limited to the examples in FIG. 4 and FIG. 5.

In an example implementation, when the terminal device 100 detects that the NFC connection to the electronic device 200 succeeds, or the terminal device 100 receives the hotspot request from the electronic device 200 after code scanning, the first query pop-up window shown in FIG. 6 pops up on the current UI interface. The first query pop-up window is used to query the user whether to allow the electronic device 200 to use the hotspot, that is, query the user whether to open the hotspot to the electronic device 200. The first query pop-up window is further provided with a first acknowledgment control and a first cancel control. If the terminal device 100 receives a tap operation performed by the user on the first acknowledgment control, the terminal device closes the first query pop-up window; and displays a second query pop-up window shown in FIG. 7 or FIG. 8. If the terminal device 100 receives a tap operation performed by the user on the first cancel control, the terminal device only closes the first query pop-up window, and does not display the second query pop-up window.

In an example implementation, if the user may not tap the first acknowledgment control or the first cancel control in the first query pop-up window within a relatively long time, it is considered that the response times out. Therefore, a first timeout threshold is set according to an actual situation, and timing is started when the first query pop-up window is displayed. If no tap operation on the first acknowledgment control and the first cancel control is received when timing duration is greater than the first timeout threshold, the first query pop-up window is closed.

In an example implementation, the user may set an enabled/disabled state of each automatic program at the end of the electronic device. The automatic program is a program that automatically starts execution after the electronic device 200 accesses a network. The automatic program may be a program that is automatically executed by a system of the electronic device 200, or may be a program that is automatically executed by an application installed on the electronic device 200. For example, on a system-related setting page, if it is set that automatic system upgrade is performed in a network connected state, an automatic program "Automatic system upgrade" is enabled. For another example, if it is set in an email application that an attachment in a new email is automatically downloaded in a network connected state, an automatic program "Automatic attachment download" is enabled. The automatic program is generally enabled by default. The user may switch an enabled/disabled state of some automatic programs according to personal wishes.

In an example implementation, after receiving the tap operation performed by the user on the first acknowledgment control in the first query pop-up window; the terminal device 100 sends a first indication message to the electronic device 200. The first indication message is used to notify the electronic device 200 that the terminal user agrees to open the hotspot to the electronic device 200. After receiving the first indication information, the electronic device 200 queries all currently enabled automatic programs of the entire system, summarizes program identifiers of the automatic programs into a program list, and then sends the program list to the terminal device 100. The terminal device 100 generates and displays the second query pop-up window based on the received program list.

In an example implementation, the program list specifically records a program identifier of an automatic program currently enabled in the electronic device. The program identifier may be an identifier preset for the automatic program, or may be a name, a category, or the like of the automatic program. A setting form of the program identifier is not specifically limited. The program identifier is globally unique. To be specific, each automatic program in the program list corresponds to only one program identifier, and each program identifier points to only one automatic program. In other words, there is a one-to-one mapping relationship instead of a one-to-many or many-to-one or many-to-many mapping relationship between automatic programs and program identifiers.

In an example implementation, the electronic device 200 may locally maintain one program list. The program list records program identifiers of all currently enabled automatic programs. When an automatic program A in the program list switches from an enabled state to a disabled state, a program identifier of the automatic program A is deleted from the program list. When an automatic program B switches from a disabled state to an enabled state, a program identifier of the automatic program B is added to the program list. This implements dynamic update of the program list, thereby facilitating management of each automatic program.

In an example implementation, after receiving the tap operation performed by the user on the first acknowledgment control in the first query pop-up window, the terminal device 100 sends a first indication message to the electronic device 200. After receiving the first indication information, the electronic device 200 directly invokes a locally maintained program list, and synchronizes the program list to the terminal device 100, so that the terminal device 100 generates and displays the second query pop-up window based on the received program list.

In an example implementation, after the electronic device 200 successfully connects to the terminal device 100 through code scanning, the user selects the hotspot of the mobile phone as a network at the end of the electronic device. If the electronic device 200 needs to send the hotspot request to the terminal device 100, the electronic device may add the locally maintained program list to the hotspot request. After parsing the hotspot request, the terminal device 100 may obtain the program list. It should be noted that a time node and an implementation of obtaining the program list by the terminal device 100 are not limited to embodiments of this application, provided that the program list is obtained before the second query pop-up window is displayed.

Figure 7:
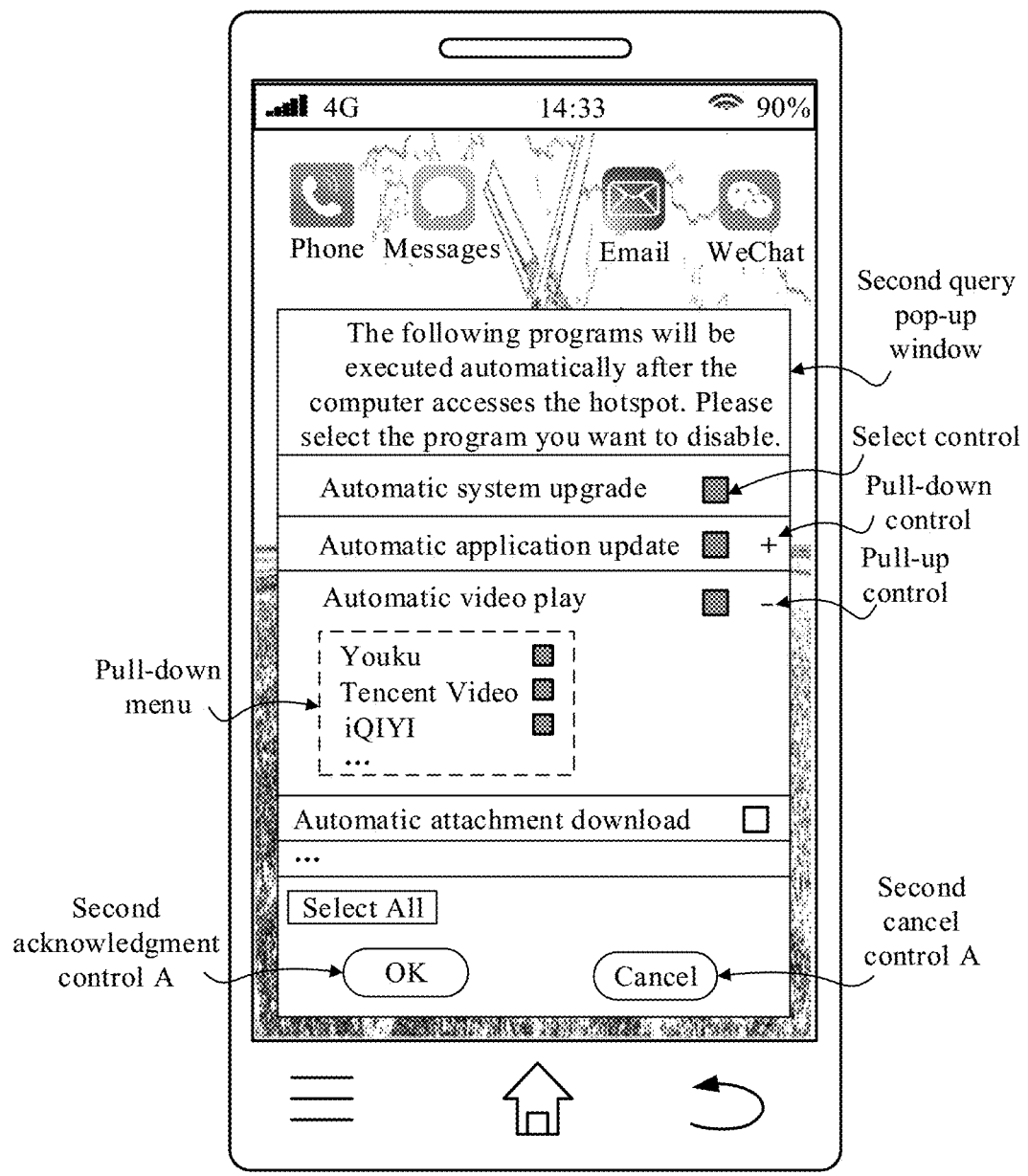
FIG. 7 is a schematic diagram of an example of a first type of second query pop-up window displayed by a terminal device.

In an example implementation, after receiving a program list from the electronic device 200, the terminal device 100 generates and displays a second query pop-up window based on the program list. The second query pop-up window is used to query the user whether to disable an automatic program. FIG. 7 shows a first type of second query pop-up window. The second query pop-up window displays a program list. The program list may include an identifier of an automatic program such as a category or a name, to help the user identify each automatic program. For example, the program identifier is "Automatic system upgrade", "Automatic application update", or "Automatic video play". Each category has a corresponding selection control. After the user taps a type of selection control, an automatic program of the category is restricted to being executed after the end of the electronic device 200 accesses hotspot Wi-Fi. The second query pop-up window may be further provided with a "Select All" control. The user only needs to tap the "Select All" control once to select all categories of automatic programs in the program list.

In an example implementation, an automatic program of a large category may be further subdivided into a plurality of small categories. For example, an application-type automatic program may be subdivided based on an application category. A pull-down control (that is, "+" in FIG. 7) may be set for the automatic program of the large category including a subcategory. As shown in FIG. 7, for example, if the user taps a pull-down control of a large category "Automatic video play", a pull-down menu is displayed. The pull-down menu includes application names of all enabled automatic video play programs, for example, subcategories such as Youku, Tencent Video, and iQIYI. Each application name has a corresponding selection control, so that the user can select a to-be-disabled automatic video play program of an application according to a use requirement. An unselected application can normally execute an automatic video play program. After selecting a subcategory, the user taps a pull-up control (that is, "–" in FIG. 7) to hide the pull-down menu. For the automatic program of the large category including a subcategory, if the user taps a selection control of the large category, all subcategories are selected by default.

In an example implementation, the second query pop-up window is further provided with a second acknowledgment control A. After selecting, from the program list, a program identifier of a target program that is restricted to being executed, the user may tap the second acknowledgment control A. When receiving the tap operation performed by the user on the second acknowledgment control A, the terminal device 100 creates a program indication set based on the program identifier of the target program selected and submitted by the user in the program list. The program indication set is a subset of the program list.

In an example implementation, the program indication set is either an empty set or includes at least one program indication. Optionally, the program indication is, for example, a program identifier of a target program that is specified by the user to be disabled. The program identifier may be a preset identifier, a name, a category, or the like of an automatic program. This is not limited in this embodiment of this application. By identifying the program indication included in the set, the electronic device may learn of some target programs that are specified by the terminal user to be disabled, so as to further control the target programs to be disabled at the local end.

In an example implementation, if the user directly taps the second acknowledgment control A without selecting an automatic program of any category/subcategory in the program list in the second query pop-up window, the terminal device 100 identifies that the program indication set is an empty set. In this case, the terminal device closes the second query pop-up window, controls a hotspot function to be enabled, and sends a second indication message to the electronic device 200. The second indication message is used to indicate the electronic device 200 not to disable any automatic program. The terminal device may select to add a Wi-Fi password of a terminal hotspot to the second indication information. After receiving the second indication information, the electronic device 200 connects to hotspot Wi-Fi of the terminal device 100 based on the Wi-Fi password, and does not restrict execution of all automatic programs of the entire system. In other words, the automatic programs may automatically start execution after detecting that the hotspot Wi-Fi connection succeeds.

In an example implementation, the second query pop-up window may be provided with a second cancel control A. Regardless of whether the user selects the target program in the program list, once the user taps the second cancel control A, it is considered by default that the end of the electronic device is authorized to perform any enabled automatic program after accessing hotspot Wi-Fi. When receiving the tap operation performed by the user on the second cancel control A, the terminal device identifies that the program indication set is an empty set. In this case, the terminal device closes the second query pop-up window, controls a hotspot function to be enabled, and sends a second indication message to the electronic device 200. The second indication message is used to indicate the electronic device 200 not to disable any automatic program. The terminal device may select to add a Wi-Fi password of a terminal hotspot to the second indication information. After receiving the second indication information, the electronic device 200 connects to hotspot Wi-Fi of the terminal device 100 based on the Wi-Fi password, and does not restrict execution of all automatic programs of the entire system. In other words, the automatic programs may automatically start execution after detecting that the hotspot Wi-Fi connection succeeds.

In an example implementation, when receiving the tap operation performed by the user on the second acknowledgment control A, the terminal device 100 closes the second query pop-up window. If the terminal device identifies that the program indication set is a non-empty set, in other words, the program indication set includes program identifiers of some or all automatic programs in the program list, the terminal device generates third indication information based on the program indication set, and sends the third indication information to the electronic device 200. The third indication information is used to indicate the electronic device 200 to disable all target programs indicated by the program indication set. After receiving the third indication information, the electronic device obtains the program indication set, and switches enabled/disabled states of all the target programs in the program indication set to disabled states. In this case, the target programs of the electronic device 200 each are switched to a trigger traffic use mode. To be specific, terminal traffic is consumed only when the user actively triggers to use these target programs; otherwise, the disabled target programs do not actively consumes the terminal traffic. After all the target programs are disabled, the electronic device 200 sends fourth indication information to the terminal device 100. The fourth indication information is used to indicate to the terminal device 100 that all the target programs indicated by the program indication set are disabled. After receiving the fourth indication information, the terminal device controls the hotspot function to be enabled, and shares the Wi-Fi password of the terminal hotspot with the electronic device 200. After the electronic device 200 receives the Wi-Fi password, the electronic device may automatically access hotspot Wi-Fi. and the local target program does not actively start execution during hotspot use.

The second query pop-up window shown in FIG. 7 supports the user in selecting no automatic program (the program indication set is an empty set) or selecting some (the program indication set is a non-empty proper subset of the program list) or all automatic programs (the program indication set is a universal set) according to wishes. In another example implementation, all the automatic programs in the program list at the end of the electronic device are disabled by default without a need of user selection. When receiving the tap operation performed by the user on the first acknowledgment control in the first query pop-up window, the terminal device closes the first query pop-up window, and does not send the foregoing first indication information to the electronic device, but directly displays a second type of second query pop-up window shown in FIG. 8. The second query pop-up window displays information used to query the user whether to disable an automatically executed program after the electronic device accesses the hotspot, and is provided with a second acknowledgment control B and a second cancel control B.

If the terminal device receives a tap operation performed by the user on the second cancel control B, the terminal device closes the second query pop-up window, and controls the hotspot function to be enabled. Optionally, the terminal device generates second indication information based on the Wi-Fi password of the hotspot, and sends the second indication information to the electronic device, so that the electronic device automatically connects to the terminal hotspot based on the Wi-Fi password. In this scenario, no automatic program in the program list at the end of the electronic device is disabled, and an automatic program may automatically start execution after detecting that the electronic device successfully connects to the hotspot. In other words, when the user taps the second cancel control B in the second query pop-up window, it is equivalent to that the program indication set obtained by the terminal device is an empty set.

In an example implementation, if the terminal device receives a tap operation performed by the user on the second acknowledgment control B, the terminal device sends fifth indication information to the electronic device. The fifth indication information is used to indicate the electronic device to disable all automatic programs that are currently enabled locally, in other words, to disable all locally maintained automatic programs in the program list. After disabling all the automatic programs in the program list in response to the received fifth indication information, the electronic device feeds back sixth indication information to the terminal device. The sixth indication information is used to notify the terminal device that all the enabled automatic programs are disabled. In response to the received sixth indication information, the terminal device controls the hotspot function to be enabled, and sends the Wi-Fi password of the hotspot to the electronic device. After receiving the Wi-Fi password, the electronic device automatically connects to the terminal hotspot based on the Wi-Fi password. In this case, the electronic device disables all the automatic programs, and is in a trigger traffic use mode. To be specific, when an application and a program are triggered by the user, the terminal traffic is consumed; otherwise, the electronic device does not actively consume the terminal traffic.

In this example, a difference between the operation that the user taps the second acknowledgment control B and the operation that the user taps the second acknowledgment control A is only as follows: When the user taps the second acknowledgment control A, the program indication set obtained by the terminal device is a subset of the program list, that is, may be an empty set, a non-empty proper subset, or a universal set, which specifically depends on behavior of the user for selecting the target program in the first type of second query pop-up window. However, when the user taps the second acknowledgment control B, all the automatic programs are disabled by default. In other words, the program indication set obtained by the terminal device is the same as the program list, that is, the program indication set is a universal set.

In the examples of the foregoing implementations, after disabling all the target programs indicated by the program indication set, the electronic device sends the fourth indication information or the sixth indication information to the terminal device, to indicate the terminal device to enable the hotspot function and feed back the Wi-Fi password of the hotspot, so that the electronic device accesses the terminal hotspot. In another example implementation, after obtaining the program indication set, the terminal device may enable the hotspot function, generate a third processing instruction based on the program indication set and the Wi-Fi password of the hotspot, and send the third processing instruction to the electronic device. After receiving the third processing instruction, the electronic device parses the third processing instruction, to obtain the program indication set and the Wi-Fi password. In this case, the end of the electronic device does not first connect to the hotspot, but first determines at the local end whether the program indication set is an empty set. If the program indication set is an empty set, in other words, the program indication set indicates that there is no to-be-disabled target program, no automatic program needs to be disabled naturally, and the electronic device directly accesses the terminal hotspot based on the Wi-Fi password. If the electronic device detects that the program indication set is a non-empty set, the electronic device disables all the target programs at the local end that are indicated by the program indication set, and then automatically connects to the terminal hotspot by using the Wi-Fi password. In other words, a step of determining whether the program indication set is an empty set may be performed by the terminal device, or may be performed by the end of the electronic device.

In an example implementation, because a communication connection is established between the terminal device 100 and the electronic device 200, before connecting to the hotspot, the electronic device 200 may obtain related device information of the terminal device 100 in advance, such as a device brand, a device model, and the Wi-Fi name of the hotspot. After the terminal device 100 enables the hotspot function, when the electronic device connects to the hotspot, the electronic device may directly obtain the Wi-Fi name of the hotspot through matching in a local wireless network connection, and then automatically input the Wi-Fi password to access and use the hotspot. For example, after connecting to the terminal device 100, the electronic device 200 learns that the device model of the terminal is Honor V40. In this case, the electronic device obtains "My Honor V40" through matching in a wireless network connection list, that is, the Wi-Fi name of the hotspot. After obtaining the Wi-Fi name and the password of the hotspot, the electronic device can successfully connect to the hotspot.

In an example implementation, if the electronic device 200 receives the third indication information, the disabled target program is specified by the program indication set. If the electronic device receives the fifth indication information, the disabled target program is an automatic program corresponding to each program identifier in the program list. After the electronic device 200 receives the third indication information or the fifth indication information, and switches each target program that matches the indication information to a disabled state, if the end of the electronic device maintains a program list, program identifiers of these disabled target programs may be deleted from the program list. In other words, unless the user subsequently modifies enabled/disabled states of these target programs again, disabled states of these target programs may be effective for a long time.

In some example implementations, the user may only want to temporarily disable the target program when connecting to the hotspot, while a user using the electronic device allows execution of these target programs in another non-hotspot network connection. Therefore, after receiving the third indication information or the fifth indication information, the electronic device 200 switches the target program that matches the indication information to a disabled state, and the program list reserves program identifiers of these target programs. After accessing hotspot Wi-Fi, the electronic device 200 keeps the target program in a disabled state during hotspot use. When the electronic device 200 detects that the hotspot connection is disconnected, for example, the terminal device 100 disables the hotspot function or the electronic device 200 actively exits the hotspot, a previously disabled target program is controlled to be restarted. In other words, disabled states of these target programs are effective only during a current hotspot connection.

In some example implementations, after the electronic device 200 receives the third indication information or the fifth indication information, and switches the target program that matches the indication information to a disabled state, a case in which the electronic device 200 cannot connect to the hotspot for a long time may occur. For example, after the terminal device 100 enables the hotspot function and sends the Wi-Fi password to the electronic device 200, the terminal user manually disables the hotspot function, or a communication exception exists between the terminal device 100 and the electronic device 200. Consequently, the electronic device does not receive the Wi-Fi password of the hotspot or the like. In other words, hotspot connection timeout occurs at the end of the electronic device. Therefore, a second timeout threshold may be set according to an actual situation, and timing is started when all target programs are disabled. If the hotspot is not successfully connected when timing duration is greater than the second timeout threshold, the previously disabled target program is controlled to be re-enabled.

By using the foregoing technical implementations, when the terminal device 100 establishes the communication connection to the electronic device 200, a terminal query mechanism is triggered: querying whether to provide a hotspot service for the electronic device 200, and querying whether to disable a program that automatically starts execution when the end of the electronic device connects to the network (including the two implementation modes shown in FIG. 7 and FIG. 8), so that the user determines, based on factors such as remaining traffic of the terminal device 100 and an application scenario of the electronic device 200, whether to restrict automatic execution of a traffic-consuming program at the end of the electronic device. After receiving corresponding indication information of the terminal device 100, the electronic device 200 either maintains the current normal traffic use mode or disables the target program specified by the terminal user. This implements the trigger traffic use mode. Therefore, when using the hotspot, the end of the electronic device 200 is more adaptable to a terminal traffic status. This avoids excessive terminal traffic consumption, ensures that the electronic device 200 can access the network normally, and improves user experience.

It should be understood that, to clearly describe a hotspot access solution implemented through interaction between two-end devices, the foregoing content provides a UI and provides technical descriptions with reference to the UI. However, UI display effects, page settings, and UI-based user operations provided in this application are merely examples, and are specifically based on actual design and application. In addition, based on the technical concept and essence of the present disclosure, adaptive adjustment and modification may be performed on some steps in a hotspot connection procedure, and a manner of connecting the terminal device 100 and the electronic device 200 is not limited to NFC and code scanning. The indication information and the processing instruction in this embodiment of this application are example term descriptions used when the two-end devices communicate, and are not specific limitations on information communication and interaction forms.

Figure 9A:
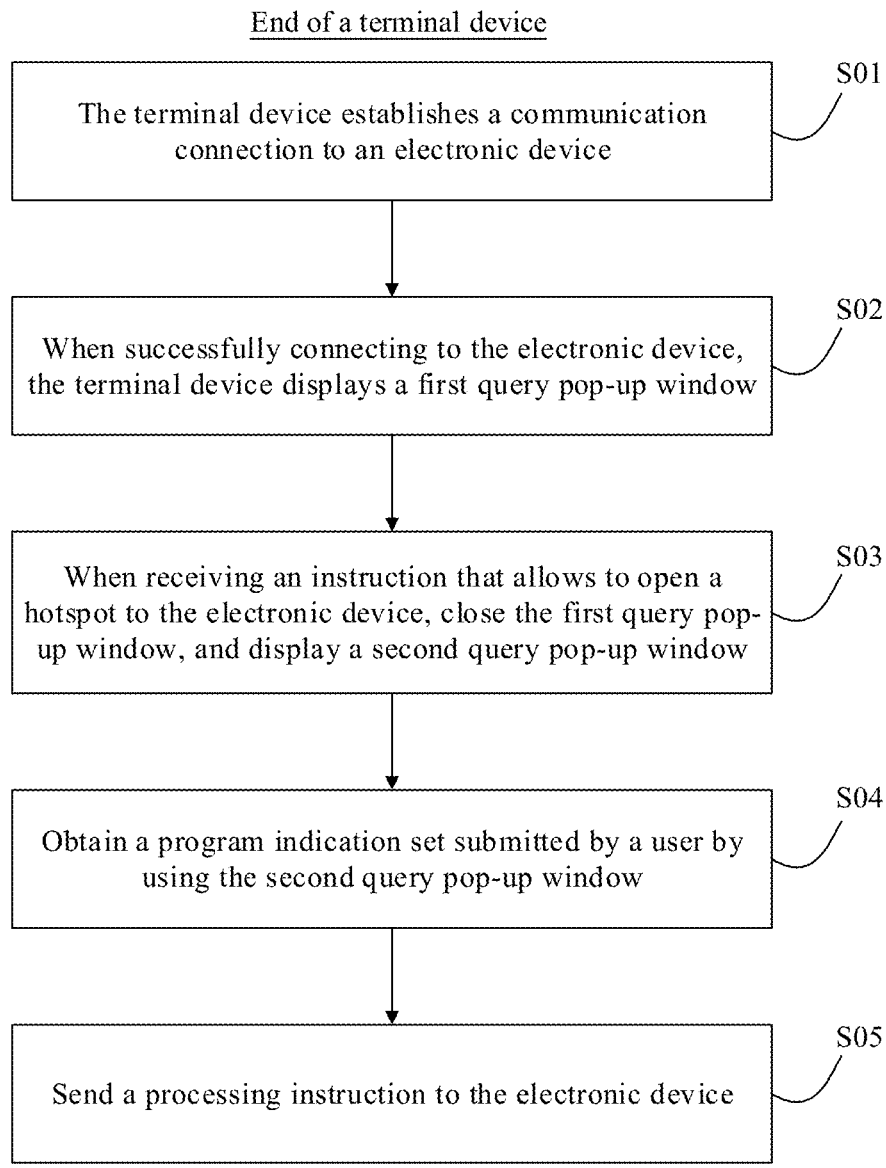
FIG. 9(a) is a flowchart of an example of a first hotspot connection method performed by an end of a terminal device.
Figure 9B:
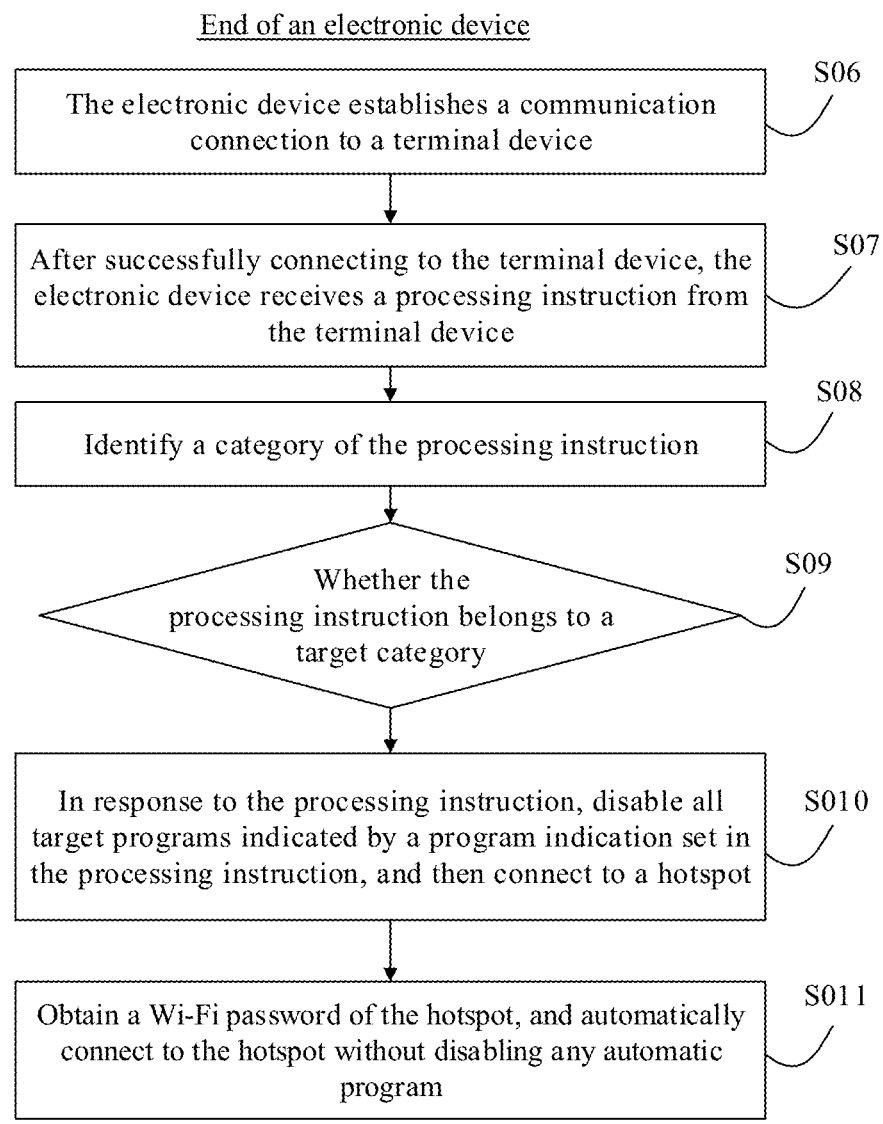
FIG. 9(b) is a flowchart of an example of a first hotspot connection method performed by an end of an electronic device.

In an example implementation, FIG. 9(*a*) provides an embodiment of a first hotspot connection method performed by the end of the terminal device. The method includes the following program steps.

Step S01: The terminal device establishes a communication connection to the electronic device.

Refer to the example of the foregoing related implementation. A manner of connecting the terminal device 100 and the electronic device 200 is not limited. For example, the terminal device and the electronic device may be connected through NFC or through code scanning based on a target application.

Step S02: When successfully connecting to the electronic device, the terminal device displays a first query pop-up window. The first query pop-up window is used to query a user whether to allow to open a hotspot to the electronic device.

Optionally, refer to the UI interface example diagram shown in FIG. 6. The first query pop-up window may be provided with a first acknowledgment control and a first cancel control. The first acknowledgment control is configured to input, when being triggered, an instruction that allows to open the hotspot to the electronic device. The first cancel control is configured to input, when being triggered, an instruction that does not allow to open the hotspot to the electronic device.

Step S03: When receiving an instruction that allows to open the hotspot to the electronic device, the terminal device closes the first query pop-up window, and displays a second query pop-up window. The second query pop-up window is used to query the user whether to disable an automatic program.

Figure 8:
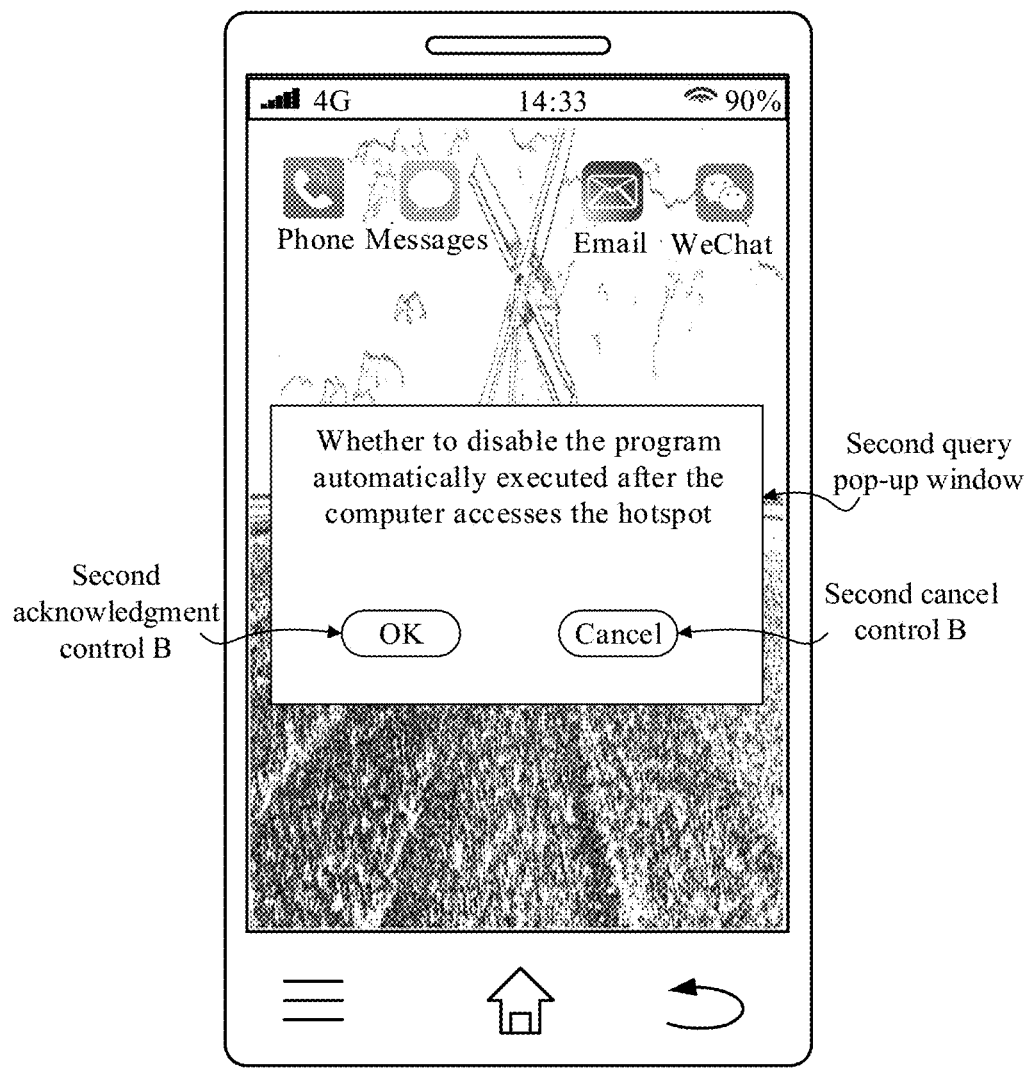
FIG. 8 is a schematic diagram of an example of a second type of second query pop-up window displayed by a terminal device.

Optionally, the second query pop-up window is in the form in FIG. 7 or FIG. 8. In FIG. 7, the user can select a to-be-disabled target program from a program list in a user-defined manner. During specific implementation, the program list may be requested by sending first indication information to the electronic device. In FIG. 8, the user can disable all currently enabled automatic programs of the electronic device at one time. In this case, first prompt information does not need to be sent to the electronic device. Different program indication sets may be obtained by performing different input operations in FIG. 7 or FIG. 8.

Step S04: The terminal device obtains a program indication set submitted by the user by using the second query pop-up window. The program indication set includes a program indication, and the program indication is used to indicate a target program that is specified by the user to be disabled to the electronic device.

In some examples, the program indication set submitted by the user by using the second query pop-up window shown in FIG. 7 may be an empty set, or may be a non-empty proper subset or a universal set of the program list; and the program indication set submitted by the user by using the second query pop-up window shown in FIG. 8 is an empty set or a universal set, and cannot be a non-empty proper subset.

Step S05: The terminal device sends a processing instruction to the electronic device. The processing instruction is used to indicate the electronic device to connect to the hotspot after all target programs indicated by the program indication set are disabled.

For step S05, the terminal device sends the processing instruction to the electronic device to achieve the following objective: It is ensured that an end of the electronic device first disables, according to an instruction of the program indication set, a target program specified by the terminal user (no automatic program needs to be disabled when there is no instruction), and then connects to the hotspot, so as to ensure that the electronic device uses the hotspot after all automatic programs of the electronic device each switch to a trigger traffic use mode. This avoids severe consumption of terminal traffic by an automatic program.

In an example implementation, corresponding to the method in FIG. 9(*a*), FIG. 9(*b*) provides an embodiment of a first hotspot connection method performed by the end of the electronic device. The method includes the following program steps.

Step S06: The electronic device establishes a communication connection to the terminal device.

Step S07: After successfully connecting to the terminal device, the electronic device receives a processing instruction from the terminal device.

Step S08: The electronic device identifies a category of the processing instruction.

In some example implementations, for example, the instruction category may be divided into at least two types: a target category and a non-target category. A processing instruction of the target category includes a program indication set. After receiving and parsing the processing instruction of the target category, the end of the electronic device may obtain the program indication set, disable a corresponding target program based on a program indication in the set, and then connect to a terminal hotspot. If the program indication set is an empty set, the program indication set indicates that there is no to-be-disabled target program. A processing instruction of the non-target category does not include a program indication set. When receiving and identifying the processing instruction of the non-target category, the end of the electronic device may directly connect to a hotspot based on an obtained Wi-Fi password without disabling any automatic program.

Step S09: The electronic device determines whether the processing instruction belongs to the target category; and if the processing instruction belongs to the target category, performs step S010; or if the processing instruction belongs to the non-target category, performs step S011.

Step S010: In response to the processing instruction, the electronic device disables all target programs indicated by the program indication set in the processing instruction, and then connects to the hotspot.

Step S011: The electronic device obtains the Wi-Fi password of the hotspot, and automatically connects to the hotspot without disabling any automatic program.

Figure 9C:
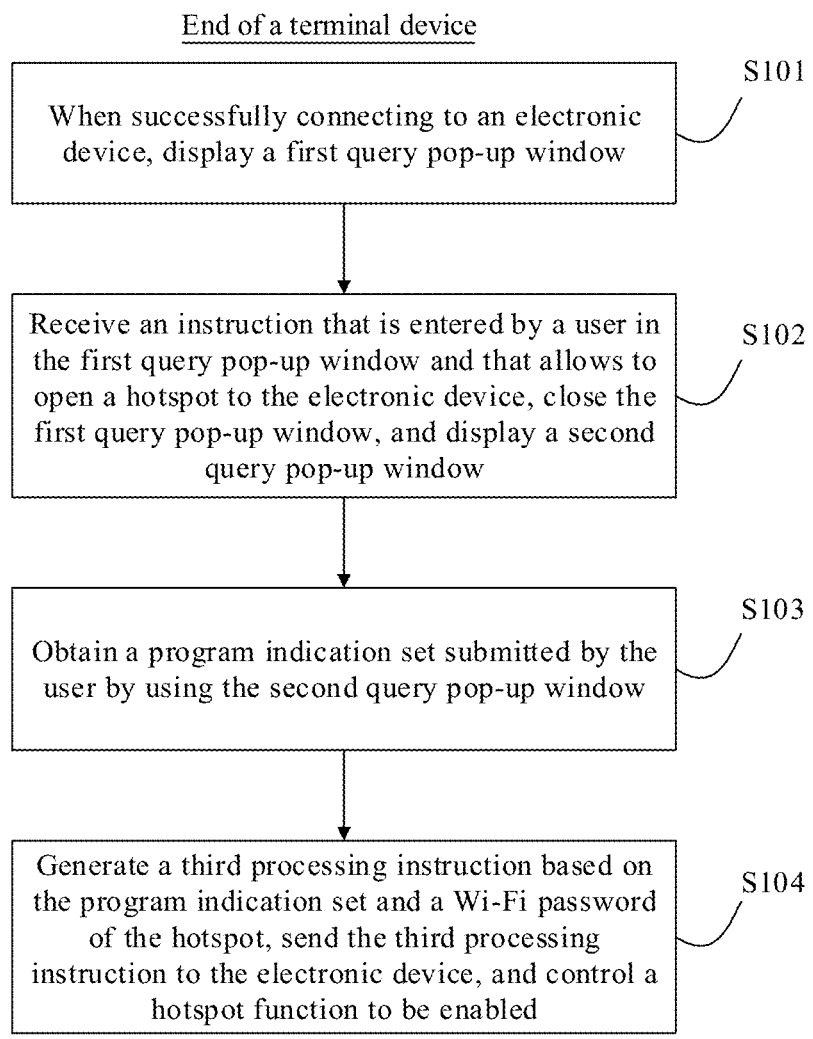
FIG. 9(c) is a flowchart of an example of a second hotspot connection method performed by an end of a terminal device.

FIG. 9(*a*) and FIG. 9(*b*) provide an example of a method in which each end device is relatively generic. During specific implementation, after the terminal device and the electronic device successfully establish the communication connection, further more detailed embodiments may be provided based on factors such as a detection result of "whether the detection program indication set is an empty set" and an execution body device of this step, and a query mode of the second query pop-up window. For details, refer to the following method embodiments described in FIG. 9(c) to FIG. 16. In different implementation mechanisms, the processing instruction may be subdivided into at least a first processing instruction, a second processing instruction, a third processing instruction, and the like. After receiving the processing instruction, the electronic device identifies the processing instruction, and then executes processing logic that matches the processing instruction.

In an example implementation, FIG. 9(c) provides an embodiment of a second hotspot connection method performed by the end of the terminal device. The terminal device 100 may be configured to perform the method program shown in FIG. 9(c). Other software and hardware configurations of the terminal device 100 are not limited. Corresponding to a step in which an end of an electronic device detects whether a program indication set is an empty set, the method includes the following program steps.

Step S101: When successfully connecting to the electronic device, the terminal device displays a first query pop-up window. The first query pop-up window is used to query a user whether to allow to open a hotspot to the electronic device, that is, whether to authorize the electronic device 200 to access the terminal hotspot.

Refer to the example of the foregoing related implementation. A manner of connecting the terminal device 100 and the electronic device 200 is not limited. For example, the terminal device and the electronic device may be connected through NFC or through code scanning based on a target application. Optionally, the first query pop-up window may be provided with a first acknowledgment control and a first cancel control. The first acknowledgment control is configured to input, when being triggered, an instruction that allows to open the hotspot to the electronic device. The first cancel control is configured to input, when being triggered, an instruction that does not allow to open the hotspot to the electronic device.

Step S102: The terminal device receives an instruction that is entered by the user in the first query pop-up window and that allows to open the hotspot to the electronic device, closes the first query pop-up window, and displays a second query pop-up window.

Optionally, the second query pop-up window is in the form in FIG. 7 or FIG. 8. In FIG. 7, the user can select a to-be-disabled target program from a program list in a user-defined manner. During specific implementation, the program list may be requested by sending first indication information to the electronic device. In FIG. 8, the user can disable all currently enabled automatic programs of the electronic device at one time. In this case, first prompt information does not need to be sent to the electronic device. Different program indication sets may be obtained by performing different input operations in FIG. 7 or FIG. 8.

Step S103: The terminal device obtains a program indication set submitted by the user by using the second query pop-up window.

Step S104: The terminal device generates a third processing instruction based on the program indication set and a Wi-Fi password of the hotspot, sends the third processing instruction to the electronic device, and controls a hotspot function to be enabled.

The third processing instruction is used to indicate the electronic device to obtain, after receiving the third processing instruction, the program indication set and the Wi-Fi password that are carried in the third processing instruction, and first detect whether the program indication set is an empty set. If the electronic device determines that the program indication set is an empty set, the electronic device automatically accesses the terminal hotspot based on the Wi-Fi password without disabling any automatic program. If the program indication set is a non-empty set, the electronic device disables all target programs indicated by the program indication set, and then automatically connects to the terminal hotspot based on the Wi-Fi password.

It should be noted that, in this embodiment, two steps of "controlling a hotspot function to be enabled" and "sending a third processing instruction" may be performed synchronously, or may be performed in a specific sequence. This is because, when receiving the third processing instruction, the end of the electronic device does not connect to the hotspot first, but first detects whether the program indication set is an empty set and then executes processing logic corresponding to the hotspot connection based on a detection result. Even if the terminal device first enables the hotspot function, the end of the electronic device does not learn of the Wi-Fi password. In this case, the electronic device cannot connect to the hotspot.

Figure 10:
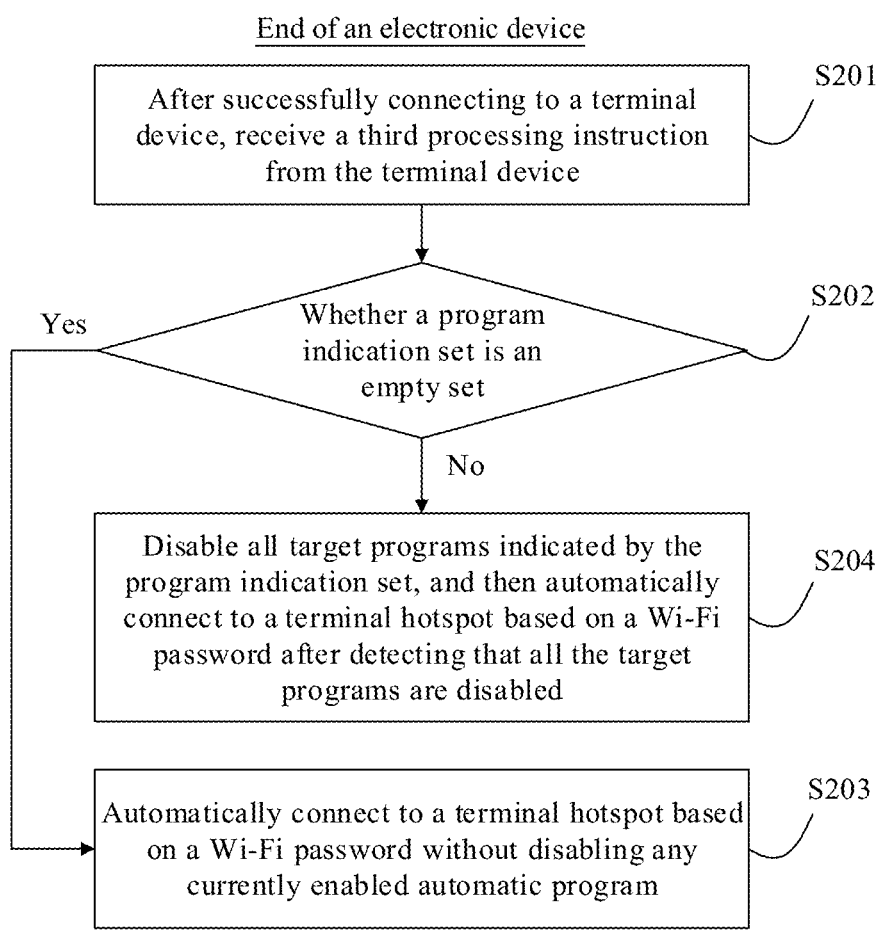
FIG. 10 is a flowchart of an example of a second hotspot connection method performed by an end of an electronic device.

In an example implementation, corresponding to the method in FIG. 9(c), FIG. 10 provides an embodiment of a second hotspot connection method performed by the end of the electronic device. The electronic device 200 may be configured to perform the method program shown in FIG. 10. Other software and hardware configurations of the terminal device 100 are not limited. The method includes the following program steps.

Step S201: After successfully connecting to the terminal device, the electronic device receives a third processing instruction from the terminal device. The third processing instruction carries a program indication set and a Wi-Fi password of a hotspot.

Step S202: The electronic device determines whether the program indication set is an empty set: and if yes, performs step S203; otherwise, performs step S204.

Step S203: The electronic device automatically connects to the terminal hotspot based on the Wi-Fi password without disabling any currently enabled automatic program.

Step S204: The electronic device disables all target programs indicated by the program indication set, and then automatically connects to the terminal hotspot based on the Wi-Fi password after detecting that all the target programs are disabled.

Figure 11:
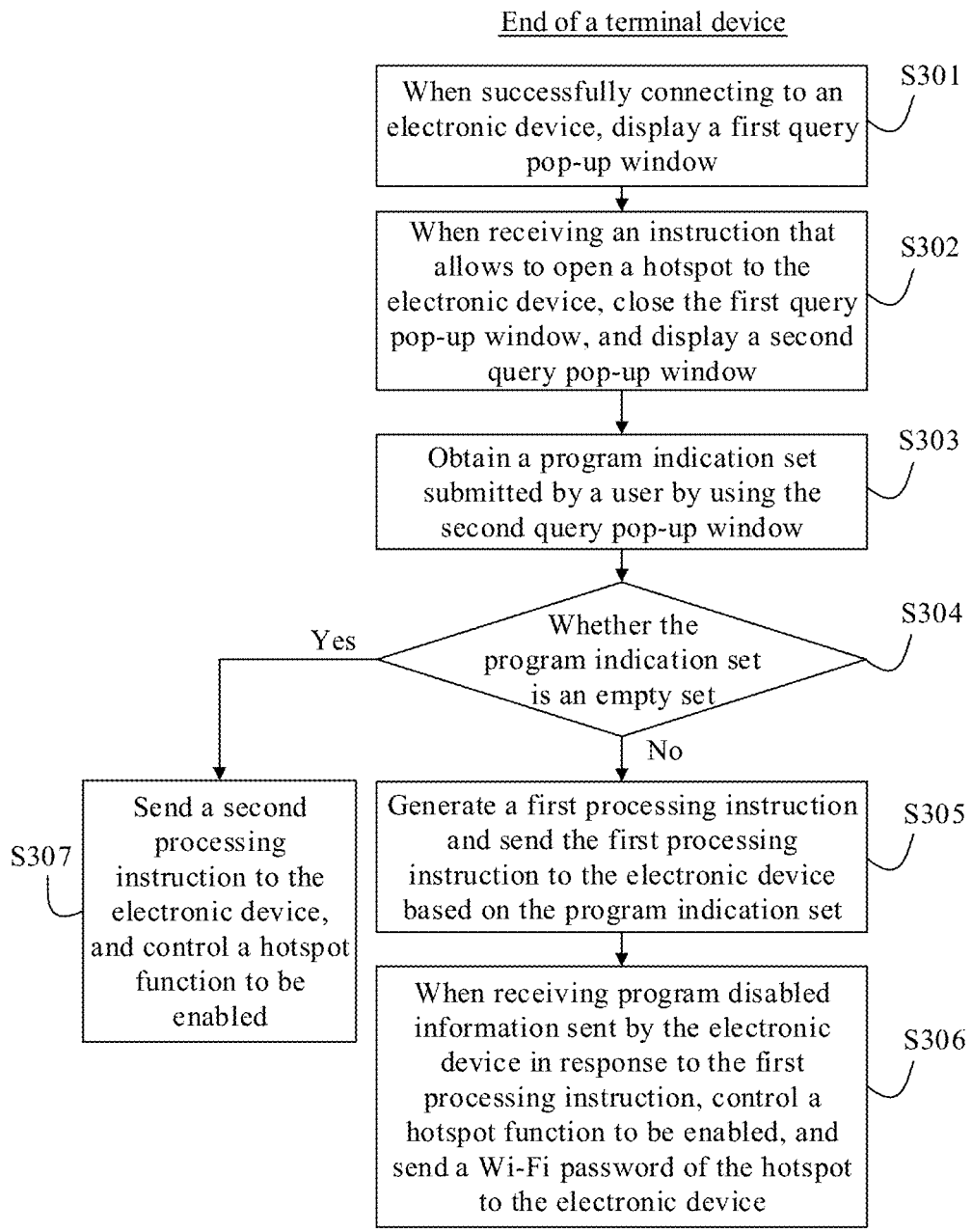
FIG. 11 is a flowchart of an example of a third hotspot connection method performed by an end of a terminal device.

In an example implementation, FIG. 11 provides an embodiment of a third hotspot connection method performed by the end of the terminal device. The terminal device 100 may be configured to perform the method program shown in FIG. 11. Other software and hardware configurations of the terminal device 100 are not limited. Corresponding to a step in which the terminal device detects whether a program indication set is an empty set, the method includes the following program steps.

Step S301: When successfully connecting to the electronic device, the terminal device displays a first query pop-up window. The first query pop-up window is used to query a user whether to allow to open a hotspot to the electronic device, that is, whether to authorize the electronic device 200 to access the terminal hotspot.

Step S302: When receiving an instruction that allows to open the hotspot to the electronic device, the terminal device closes the first query pop-up window, and displays a second query pop-up window. The second query pop-up window is used to query the user whether to disable an automatic program.

Step S303: The terminal device obtains a program indication set submitted by the user by using the second query pop-up window.

Step S304: The terminal device determines whether the program indication set is an empty set; and if no, performs step S305 and step S306; or if yes, performs step S307.

Step S305: The terminal device generates a first processing instruction and send the first processing instruction to the electronic device based on the program indication set. The first processing instruction is used to indicate the electronic device to request to obtain a Wi-Fi password of the hotspot from the terminal device after all target programs indicated by the program indication set are disabled.

Step S306: When receiving program disabled information from the electronic device in response to the first processing instruction, the terminal device controls a hotspot function to be enabled, and sends the Wi-Fi password of the hotspot to the electronic device.

When the second query pop-up window uses the mode shown in FIG. 7, the first processing instruction is equivalent to the foregoing third indication information. If the second query pop-up window uses the mode shown in FIG. 8, the first processing instruction is equivalent to the foregoing fifth indication information. The program disabled information is used to notify the terminal device 100 of disabled target programs indicated by the program indication set or disabled automatic programs corresponding to all program identifiers in the program list. If the second query pop-up window uses the mode shown in FIG. 7, the program disabled information is equivalent to the foregoing fourth indication information. If the second query pop-up window uses the mode shown in FIG. 8, the program disabled information is equivalent to the foregoing sixth indication information. After receiving the program disabled information, the terminal device 100 shares the Wi-Fi password of the hotspot with the electronic device 200, so that the electronic device 200 automatically connects to and uses the terminal hotspot by using the Wi-Fi password.

Step S307: The terminal device sends a second processing instruction to the electronic device, to control the hotspot function to be enabled.

Optionally, the second processing instruction may carry the Wi-Fi password of the hotspot, and the second processing instruction is used to indicate the electronic device 200 not to disable any automatic program, but automatically connect to the terminal hotspot by using the Wi-Fi password. Regardless of whether the second query pop-up window uses the mode shown in FIG. 7 or FIG. 8, if the program indication set is an empty set, the second processing instruction is equivalent to the foregoing second indication information, and the second processing instruction does not include the program indication set. In this embodiment, two steps of "controlling a hotspot function to be enabled" and "sending a second processing instruction" may be performed synchronously, or may be performed in a specific sequence.

Figure 12:
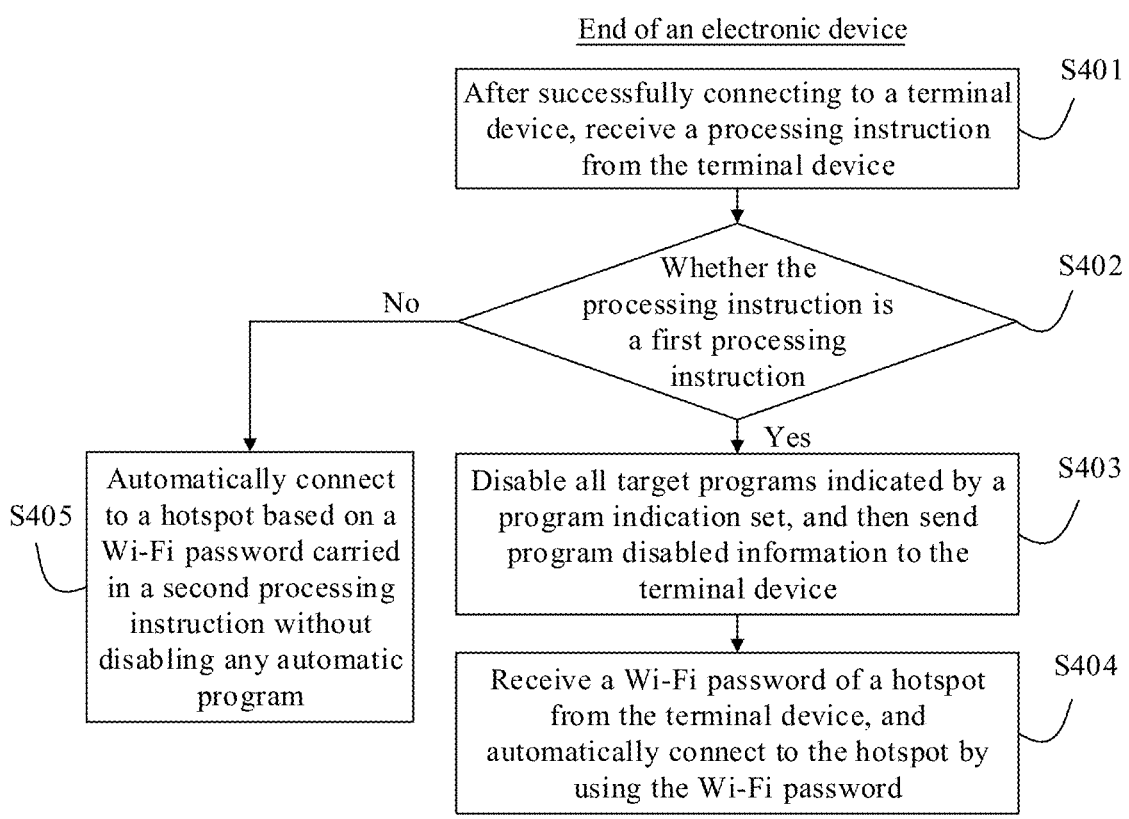
FIG. 12 is a flowchart of an example of a third hotspot connection method performed by an end of an electronic device.

In an example implementation, corresponding to the method in FIG. 11, FIG. 12 provides an embodiment of a third hotspot connection method performed by the end of the electronic device. The electronic device 200 may be configured to perform the method program shown in FIG. 12. Other software and hardware configurations of the terminal device 100 are not limited. The method includes the following program steps.

Step S401: After successfully connecting to the terminal device, the electronic device receives a processing instruction from the terminal device.

Step S402: The electronic device identifies whether the processing instruction is a first processing instruction; and if yes, performs step S403 and step S404; or if it is identified that the processing instruction is a second processing instruction, performs step S405.

The first processing instruction is sent by the terminal device 100 when the terminal device receives an instruction that allows to open a hotspot to the electronic device 200, obtains a program indication set submitted by a terminal user, and detects that the program indication set is a non-empty set. The second processing instruction is sent by the terminal device 100 when the terminal device receives an instruction that allows to open a hotspot to the electronic device 200, obtains a program indication set submitted by a terminal user, and detects that the program indication set is an empty set.

Step S403: The electronic device disables all target programs indicated by the program indication set, and then sends program disabled information to the terminal device. The program disabled information is used to notify the terminal device that all the target programs are disabled, and used to request a Wi-Fi password of the hotspot.

Step S404: The electronic device receives the Wi-Fi password of the hotspot from the terminal device, and automatically connects to the hotspot by using the Wi-Fi password.

Step S405: The electronic device automatically connects to the hotspot based on the Wi-Fi password carried in the second processing instruction without disabling any automatic program.

Figure 13:
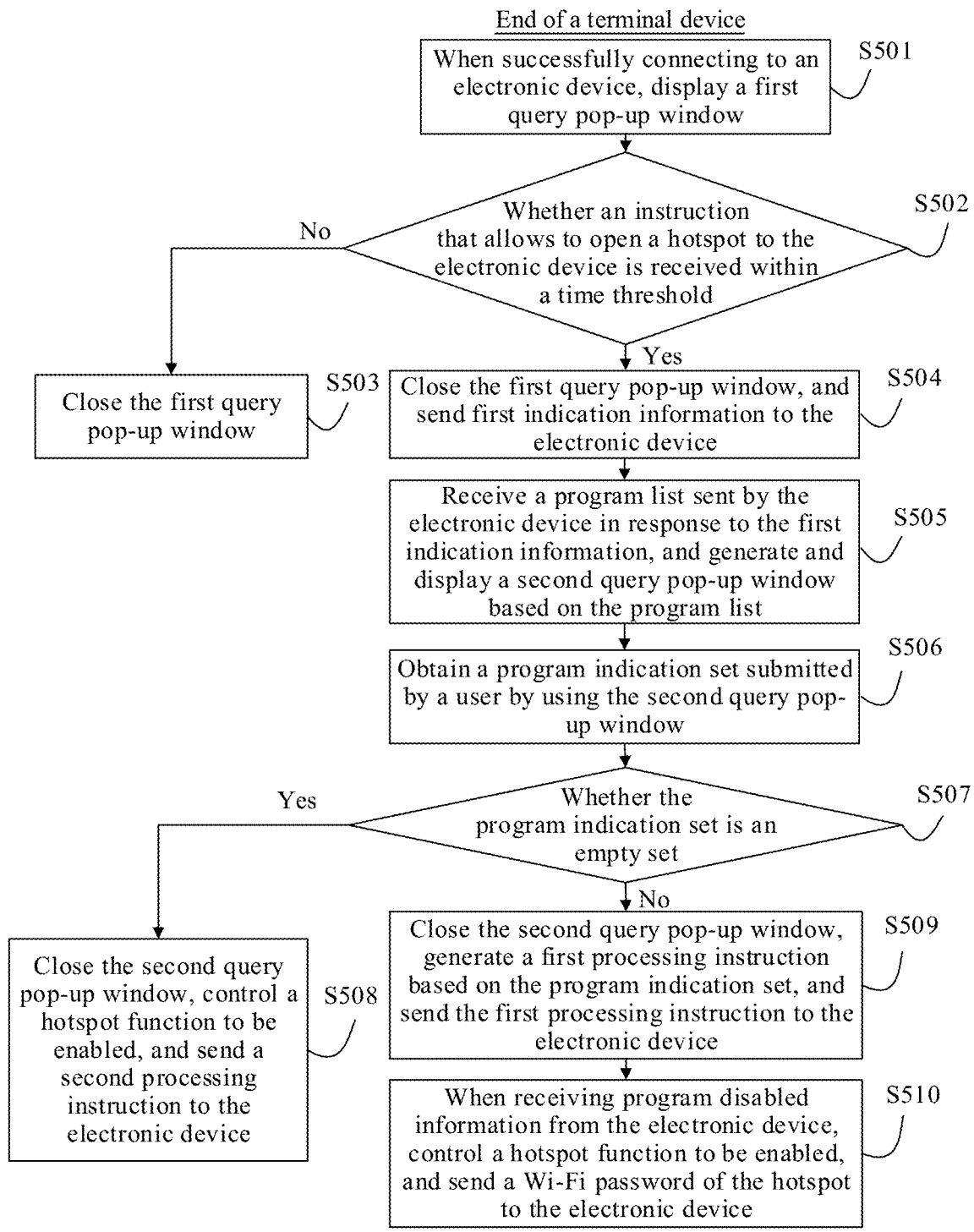
FIG. 13 is a flowchart of an example of a fourth hotspot connection method performed by an end of a terminal device.

Adaptively refer to the foregoing descriptions of the second hotspot connection method performed by the end of the terminal device, which corresponds to the second query pop-up window shown in FIG. 7. As shown in FIG. 13, this application provides an embodiment of a fourth hotspot connection method performed by the end of the terminal device. The terminal device 100 may be configured to perform the method program shown in FIG. 13. Other software and hardware configurations of the terminal device 100 are not limited. The method includes the following program steps.

Step S501: When successfully connecting to the electronic device, the terminal device displays a first query pop-up window. The first query pop-up window is used to query a user whether to allow to open a hotspot to the electronic device, that is, whether to authorize the electronic device 200 to access the terminal hotspot.

Step S502: The terminal device determines whether an instruction that allows to open the hotspot to the electronic device is received within a time threshold; and if no, to be specific, if the user taps a first cancel control within the time threshold or the user does not perform an operation within the time threshold (response timeout), performs step S503; or if yes, performs step S504.

Step S503: The terminal device closes the first query pop-up window.

Step S504: The terminal device closes the first query pop-up window, and sends first indication information to the electronic device.

The first indication information is used to notify the electronic device 200 that the terminal user agrees to open the hotspot to the electronic device, so that the electronic device 200 sends a program list to the terminal device 100. The program list includes program identifiers of all currently enabled automatic programs of the electronic device.

Step S505: The terminal device receives the program list that is sent by the electronic device in response to the first indication information, and generates and displays a second query pop-up window based on the program list.

The second query pop-up window displays the program list. The program list displays the program identifiers of all the currently enabled automatic programs of the electronic device. The user may select no automatic program, or may select some or all of the automatic programs. An automatic program that is specified by the user to be disabled is named a target program. Program identifiers of all target programs may form a program indication set. The second query pop-up window may be selected to be provided with a second acknowledgment control A and a second cancel control A. The second acknowledgment control A is configured to confirm, when being triggered, that a selected target program is submitted. The second cancel control A is configured to input, when being triggered, an instruction indicating not to disable any automatic program, which is equivalent to that a program indication set that is an empty set is submitted.

Step S506: The terminal device obtains a program indication set submitted by the user by using the second query pop-up window.

Step S507: The terminal device determines whether the program indication set is an empty set; and if yes, performs step S508; or if no, performs step S509 and S510.

Step S508: The terminal device closes the second query pop-up window, controls a hotspot function to be enabled, and sends a second processing instruction to the electronic device. Optionally, the second processing instruction may carry a Wi-Fi password of the hotspot, and the second processing instruction is used to indicate the electronic device not to disable any automatic program, and connect to the terminal hotspot based on the Wi-Fi password.

Step S509: The terminal device closes the second query pop-up window, generates a first processing instruction based on the program indication set, and sends the first processing instruction to the electronic device. The first processing instruction is used to indicate the electronic device to disable all target programs indicated by the program indication set, and send program disabled information to the terminal device after all the target programs are disabled.

Step S510: When receiving the program disabled information from the electronic device, the terminal device controls a hotspot function to be enabled, and sends a Wi-Fi password of the hotspot to the electronic device. After receiving the Wi-Fi password, the electronic device 200 may automatically access hotspot Wi-Fi. During use of hotspot Wi-Fi, the electronic device is in a trigger traffic use mode, and the disabled automatic programs do not actively start execution in a non-user-trigger state.

Figure 14:
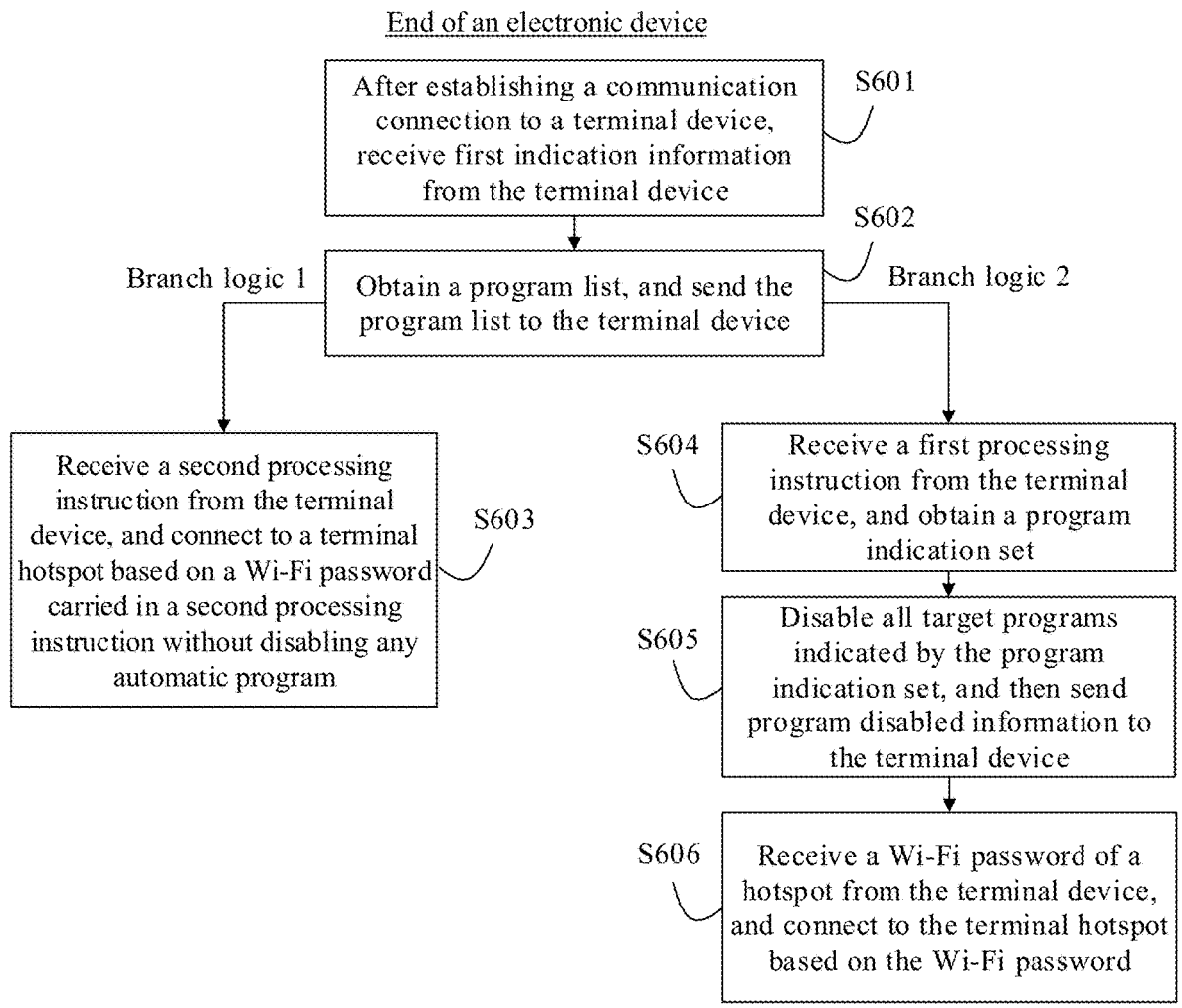
FIG. 14 is a flowchart of an example of a fourth hotspot connection method performed by an end of an electronic device.

Corresponding to the foregoing method performed by the terminal device shown in FIG. 13, FIG. 14 shows an embodiment of a fourth hotspot connection method performed by the end of the electronic device. The electronic device 200 may be configured to perform the method shown in FIG. 14. Other software and hardware configurations of the electronic device 200 are not limited. The method includes the following program steps.

Step S601: After establishing a communication connection to the terminal device, the electronic device receives first indication information from the terminal device.

The communication connection between the two-end devices is not limited to an NFC connection, a code scanning connection, or the like. The first indication information is sent by the terminal device after the terminal device receives an instruction that allows to open a hotspot to the electronic device.

Step S602: The electronic device obtains a program list, and sends the program list to the terminal device.

The program list includes program identifiers of all currently enabled automatic programs of the electronic device, and the program list is used by a terminal user to select a to-be-disabled target program from the program list to form a program indication set. There are two types of branch logic based on whether the program indication set is an empty set. Branch logic 1 corresponds to step S603, and branch logic 2 corresponds to step S604 to step S606.

Branch logic 1: Step S603: The electronic device receives a second processing instruction from the terminal device, and connects to the terminal hotspot based on a Wi-Fi password carried in the second processing instruction without disabling any automatic program.

The second processing instruction is sent when the terminal device detects that the program indication set is an empty set, and the second processing instruction may carry the Wi-Fi password shared when the terminal device enables a hotspot function, so that the end of the electronic device accesses the hotspot.

Branch logic 2:

Step S604: The electronic device receives a first processing instruction from the terminal device, and obtains the program indication set.

The first processing instruction is generated and sent based on the program indication set when the terminal device detects that the program indication set is a non-empty set. Therefore, after parsing the first processing instruction, the electronic device may obtain the program indication set.

Step S605: The electronic device disables all target programs indicated by the program indication set, and then sends program disabled information to the terminal device. The program disabled information is used to indicate the terminal device to enable the hotspot function and feed back the Wi-Fi password of the hotspot.

In an example, it is assumed that a processing instruction is {off|Type1: automatic system upgrade; Type2: automatic application update; Type3: Tencent Video automatic play; Type4: Mailbox Master automatically downloads an attachment}. A start field "off" of the processing instruction is used to identify that the information type is the first processing instruction, indicating that the four target programs Type1 to Type4 need to be disabled, and the obtained program indication set is {Type1: automatic system upgrade; Type2: automatic application update; Type3: Tencent Video automatic play; Type4: Mailbox Master automatically downloads an attachment}. Then, the electronic device may deliver a corresponding control instruction to a corresponding underlying module based on a program identifier of a target program. For example, the electronic device delivers a control instruction for disabling "automatic system upgrade" to a system management module, delivers a control instruction for disabling "automatic application update" to an application management module, delivers a control instruction for disabling "automatic video play" to Tencent Video, and delivers a control instruction for disabling "automatic attachment download" to Mailbox Master, so as to disable each target program indicated by the program indication set. It should be noted that the processing instruction herein is merely an example, and does not mean an actual structure and content. In addition, the electronic device may adaptively perform a program disabling operation based on a category of the target program, and a manner of controlling a program to be disabled is not limited.

Step S606: The electronic device receives the Wi-Fi password of the hotspot from the terminal device, and connects to the terminal hotspot based on the Wi-Fi password.

Figure 15:
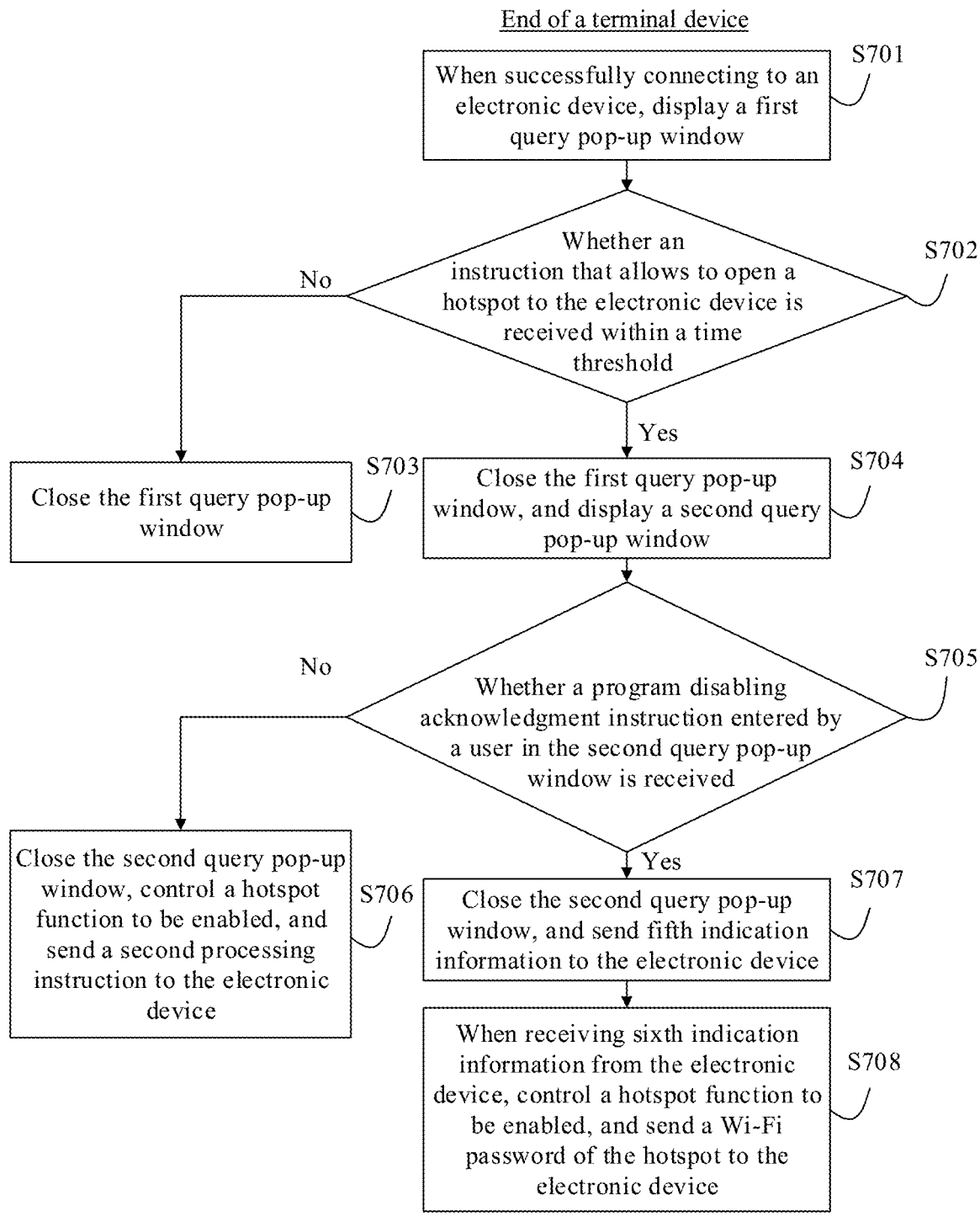
FIG. 15 is a flowchart of an example of a fifth hotspot connection method performed by an end of a terminal device.

Adaptively refer to the foregoing descriptions of the second hotspot connection method performed by the end of the terminal device, which corresponds to the second query pop-up window shown in FIG. 8. As shown in FIG. 15, this application further provides an embodiment of a fifth hotspot connection method performed by the end of the terminal device. The terminal device 100 may be configured to perform the method program shown in FIG. 15. Other software and hardware configurations of the terminal device 100 are not limited. The method includes the following steps.

Step S701: When successfully connecting to the electronic device, the terminal device displays a first query pop-up window. The first query pop-up window is used to query a user whether to allow to open a hotspot to the electronic device, that is, whether to authorize the electronic device 200 to access the terminal hotspot.

Step S702: The terminal device determines whether an instruction that allows to open the hotspot to the electronic device is received within a time threshold; and if no, to be specific, if the user taps a first cancel control within the time threshold or the user does not perform an operation within the time threshold (response timeout), performs step S703; or if yes, performs step S704.

Step S703: The terminal device closes the first query pop-up window.

Step S704: The terminal device closes the first query pop-up window, and displays a second query pop-up window.

In this method, the second query pop-up window is used to query the user whether to disable all programs that are automatically executed after the electronic device accesses the hotspot. Optionally, the second query pop-up window may be selected to be provided with a second acknowledgment control B and a second cancel control B. The second acknowledgment control B is configured to confirm, when being triggered, that all the automatic programs are disabled, that is, the program indication set is a non-empty universal set. The second cancel control B is configured to input, when being triggered, an instruction indicating not to disable any automatic program, that is, the program indication set is an empty set.

Step S705: The terminal device determines whether a program disabling acknowledgment instruction entered by the user in the second query pop-up window is received; and if no, it indicates that the user taps the second cancel control B in the second query pop-up window, and the terminal device performs step S706; or if yes, it indicates that the user taps the second acknowledgment control B in the second query pop-up window, and the terminal device performs S707 and S708.

Step S706: The terminal device closes the second query pop-up window, controls a hotspot function to be enabled, and sends a second processing instruction to the electronic device. Optionally, the second processing instruction carries a Wi-Fi password of the hotspot, so as to indicate the electronic device to directly connect to the terminal hotspot based on the Wi-Fi password without disabling any automatic program in a program list.

Step S707: The terminal device closes the second query pop-up window, and sends fifth indication information to the electronic device. The fifth indication information is used to indicate the electronic device to disable all automatic programs that are currently enabled locally, and send sixth indication information to the terminal device after all automatic programs in the program list are disabled.

Step S708: When receiving the sixth indication information from the electronic device, the terminal device controls a hotspot function to be enabled, and sends a Wi-Fi password of the hotspot to the electronic device. After receiving the Wi-Fi password, the electronic device 200 may automatically access hotspot Wi-Fi. During use of hotspot Wi-Fi, the electronic device is in a trigger traffic use mode, and the disabled automatic programs do not actively start execution in a non-user-trigger state.

Figure 16:
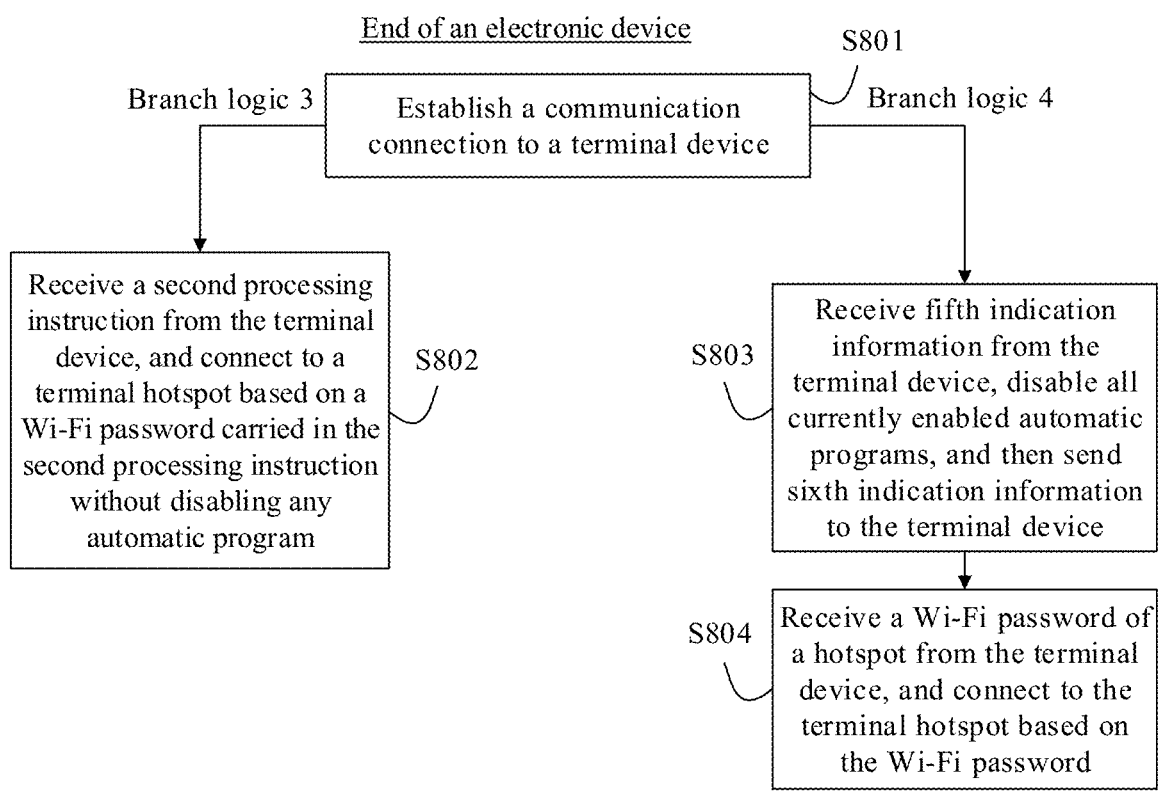
FIG. 16 is a flowchart of an example of a fifth hotspot connection method performed by an end of an electronic device.

Corresponding to the foregoing peer-device execution method, FIG. 16 shows an embodiment of a fifth hotspot connection method performed by the end of the electronic device. The electronic device 200 may be configured to perform the method shown in FIG. 16. Other software and hardware configurations of the electronic device 200 are not limited. The method includes the following program steps.

Step S801: The electronic device establishes a communication connection to the terminal device.

The communication connection between the two-end devices is not limited to an NFC connection, a code scanning connection, or the like. There are two types of branch logic according to different instructions entered by the user by taping different controls in the second query pop-up window shown in FIG. 8. Branch logic 3 corresponds to step S802, and branch logic 4 corresponds to step S803 and step S804.

Branch logic 3: Step S802: The electronic device receives a second processing instruction from the terminal device, and connects to a terminal hotspot based on a Wi-Fi password carried in the second processing instruction without disabling any automatic program.

The second processing instruction is sent when the terminal device receives a tap operation on a second cancel control B, and the second processing instruction may carry the Wi-Fi password shared when the terminal device enables a hotspot function, so that the electronic device accesses the terminal hotspot.

Branch logic 4:

Step S803: The electronic device receives fifth indication information from the terminal device, disables all currently enabled automatic programs, and then sends sixth indication information to the terminal device.

The fifth indication information is sent when the terminal device receives the tap operation on the second acknowledgment control B, and the sixth indication information is used to indicate the terminal device to enable a hotspot function and feed back a Wi-Fi password of the hotspot.

Step S804: The electronic device receives the Wi-Fi password of the hotspot from the terminal device, and connects to the terminal hotspot based on the Wi-Fi password.

Both the first processing instruction and the third processing instruction belong to a target category, and the second processing instruction belongs to a non-target category. In some example implementations, an instruction identifier may be set in a specified field in a processing instruction. The electronic device may learn of a specific category of the processing instruction by reading and identifying the instruction identifier. As an example only, if the instruction identifier that is read by the electronic device is orderT1, the processing instruction is identified as the first processing instruction of a target category. If the instruction identifier that is read by the electronic device is orderT3, the processing instruction is identified as the third processing instruction of a target category. If the instruction identifier that is read by the electronic device is orderNOOFF, the processing instruction is identified as the second processing instruction of a non-target category.

In an example implementation, for a processing instruction of the target category, a set field may be set in the instruction, and the set field is used to record a program indication set obtained by the terminal device. The program indication set may be an empty set, or a non-empty proper subset or a universal set of a program list. The electronic device may obtain the program indication set by reading the set field in the processing instruction. If the processing instruction is the first processing instruction, the electronic device directly disables all target programs indicated by the program indication set, and then connects to the terminal hotspot. If the processing instruction is the third processing instruction, after obtaining the program indication set, the electronic device first detects whether the set is an empty set, and executes corresponding processing logic based on a detection structure.

In an example implementation, for a processing instruction of the non-target category, for example, the second processing instruction, no set field may be set in the processing instruction, or a set field is set as an empty field. Optionally, a password field may be further set in the second processing instruction, and the Wi-Fi password of the terminal hotspot is recorded in the password field. If the electronic device identifies that the second processing instruction is received, the electronic device reads the password field to obtain the Wi-Fi password, so that the electronic device can automatically access the terminal hotspot.

It should be noted that content such as category division, a format, or a code configuration of the processing instruction in this application is not specifically limited.

Figure 17A:
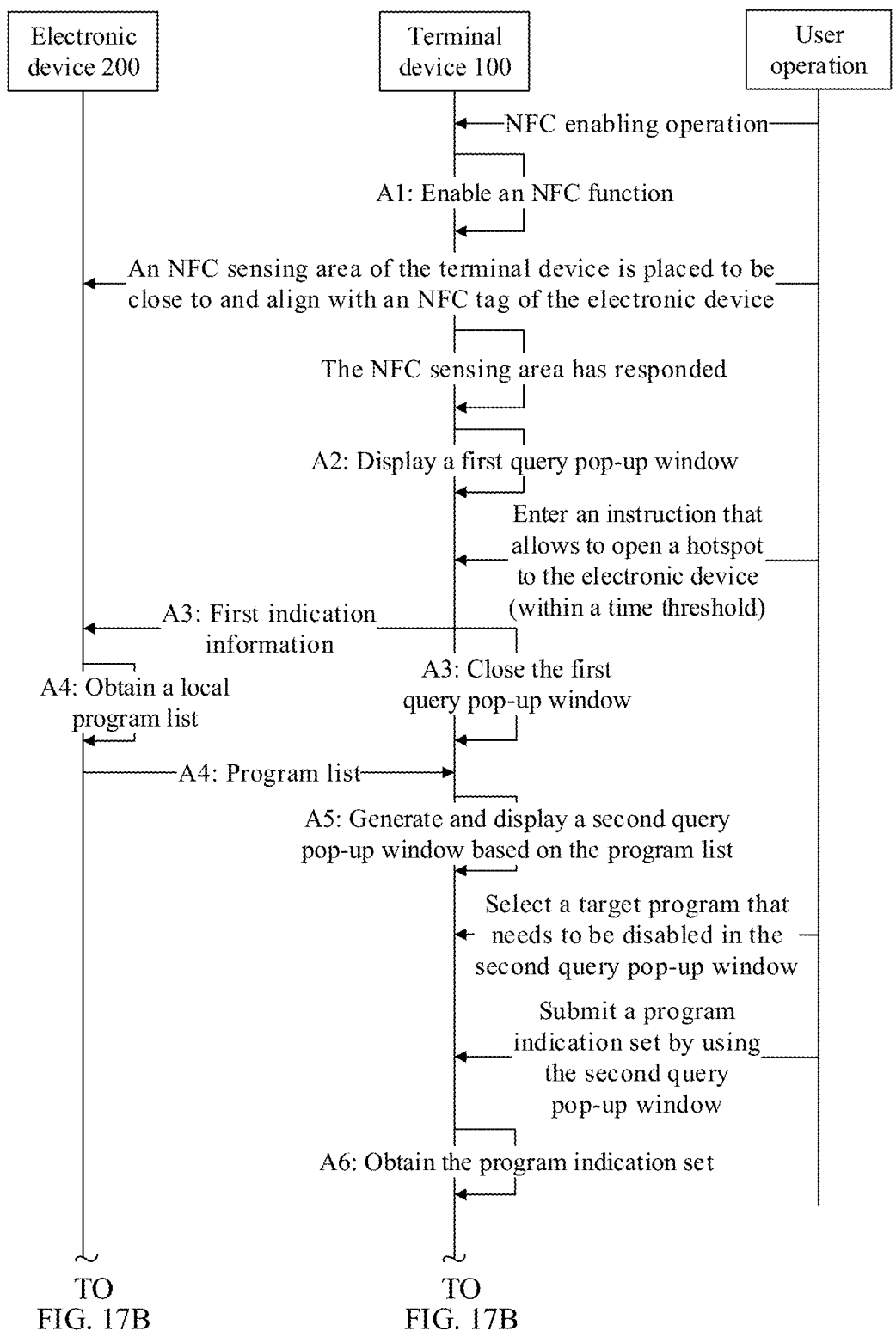
FIG. 17A and FIG. 17B are a diagram of an example of first signaling interaction between a terminal device and an electronic device.
Figure 17B:
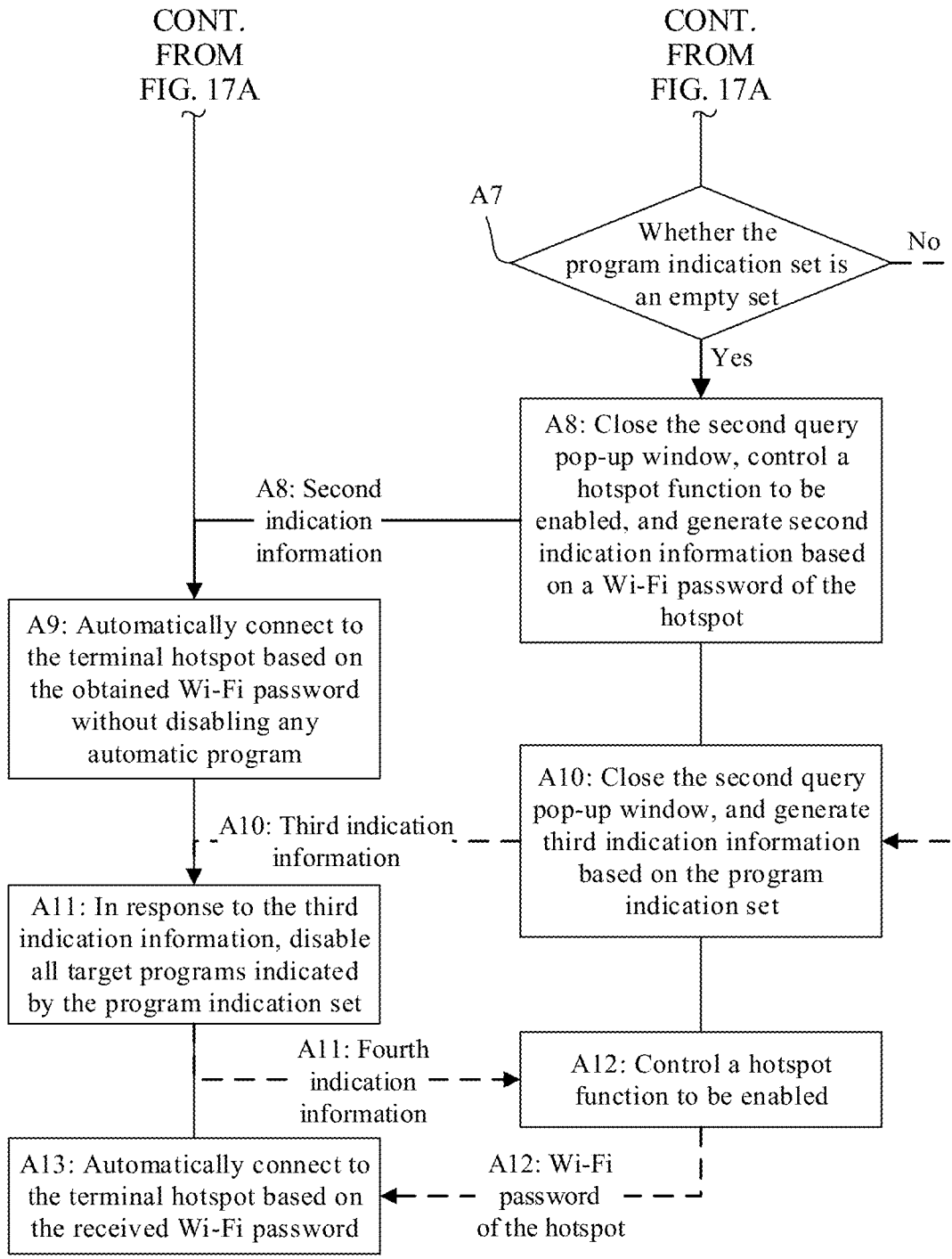

In some example implementations, FIG. 17A and FIG. 17B provide an example of first signaling interaction logic for performing a hotspot connection. Dual interaction ends include the terminal device 100 and the electronic device 200. An example in which the terminal device 100 and the electronic device 200 perform an NFC connection and the terminal device determines whether a program indication set is an empty set is used, which corresponds to the second query pop-up window shown in FIG. 7. The signaling interaction logic includes the following program steps:

Step (A1): When receiving an NFC enabling operation entered by a user, the end of the terminal device enables an NFC function. When the NFC function is enabled, and the electronic device 200 is powered on and works normally, an NFC sensing area of the terminal device 100 is placed by the user to be close to and align with an NFC tag of the electronic device, to establish an NFC connection between the two-end devices.

Step (A2): When the end of the terminal device detects that the NFC sensing area has responded, it indicates that the NFC connection between the terminal device 100 and the electronic device 200 succeeds, and the end of the terminal device displays a first query pop-up window. If the terminal device 100 does not respond, the NFC connection between the two-end devices fails, and the terminal device 100 and the electronic device 200 each maintain a current state.

Step (A3): When receiving, within a time threshold, an instruction that allows to open a hotspot to the electronic device and that is entered by the user by using a first query pop-up window, the end of the terminal device closes the first query pop-up window, and sends first indication information to the electronic device. If the user enters, only after the time threshold is exceeded, the instruction that allows to open the hotspot to the electronic device, or the user enters, by using the first query pop-up window, an instruction that does not allow to open the hotspot to the electronic device, the terminal device merely closes the first query pop-up window, does not send the first indication information to the electronic device, and subsequently does not display a second query pop-up window.

Step (A4): After receiving the first indication information, the end of the electronic device obtains a local program list, and sends the program list to the terminal device. The program list records program identifiers of all currently enabled automatic programs of the electronic device.

Step (A5): After receiving the program list, the end of the terminal device generates and displays the second query pop-up window based on the program list. The second query pop-up window displays the program list to the terminal user, so that the user selects target programs that need to be disabled from the program list, to form a program indication set based on program identifiers of the selected target programs.

Step (A6): The end of the terminal device obtains the program indication set submitted by the user by using the second query pop-up window. The program indication set is an empty set or a non-empty set. For example, if the user taps a second acknowledgment control A without selecting any target program in the second query pop-up window, or if the user finally taps a second cancel control A regardless of whether the user selects a target program, the program indication set is an empty set.

Step (A7): The end of the terminal device determines whether the program indication set is an empty set. If the program indication set is an empty set, step (A8) and step (A9) are performed. If the program indication set is a non-empty set, step (A10) to step (A13) are performed.

Step (A8): The end of the terminal device closes the second query pop-up window, controls a hotspot function to be enabled, generates second indication information based on a Wi-Fi password of the hotspot, and sends the second indication information to the electronic device.

Step (A9): After receiving the second indication information, the end of the electronic device automatically connects to the terminal hotspot based on the obtained Wi-Fi password without disabling any automatic program. In other words, after the electronic device successfully accesses the hotspot, if an automatic program detects that the electronic device connects to the Wi-Fi network, the automatic program is allowed to automatically start execution.

Step (A10): The end of the terminal device closes the second query pop-up window, generates third indication information based on the program indication set, and sends the third indication information to the electronic device.

Step (A11): In response to the third indication information, the end of the electronic device sends fourth indication information to the terminal device after all target programs indicated by the program indication set are disabled.

Step (A12): After receiving the fourth indication information, the end of the terminal device controls the hotspot function to be enabled, and sends the Wi-Fi password of the hotspot to the electronic device.

Step (A13): The end of the electronic device automatically connects to the terminal hotspot based on the received Wi-Fi password.

Figure 18A:
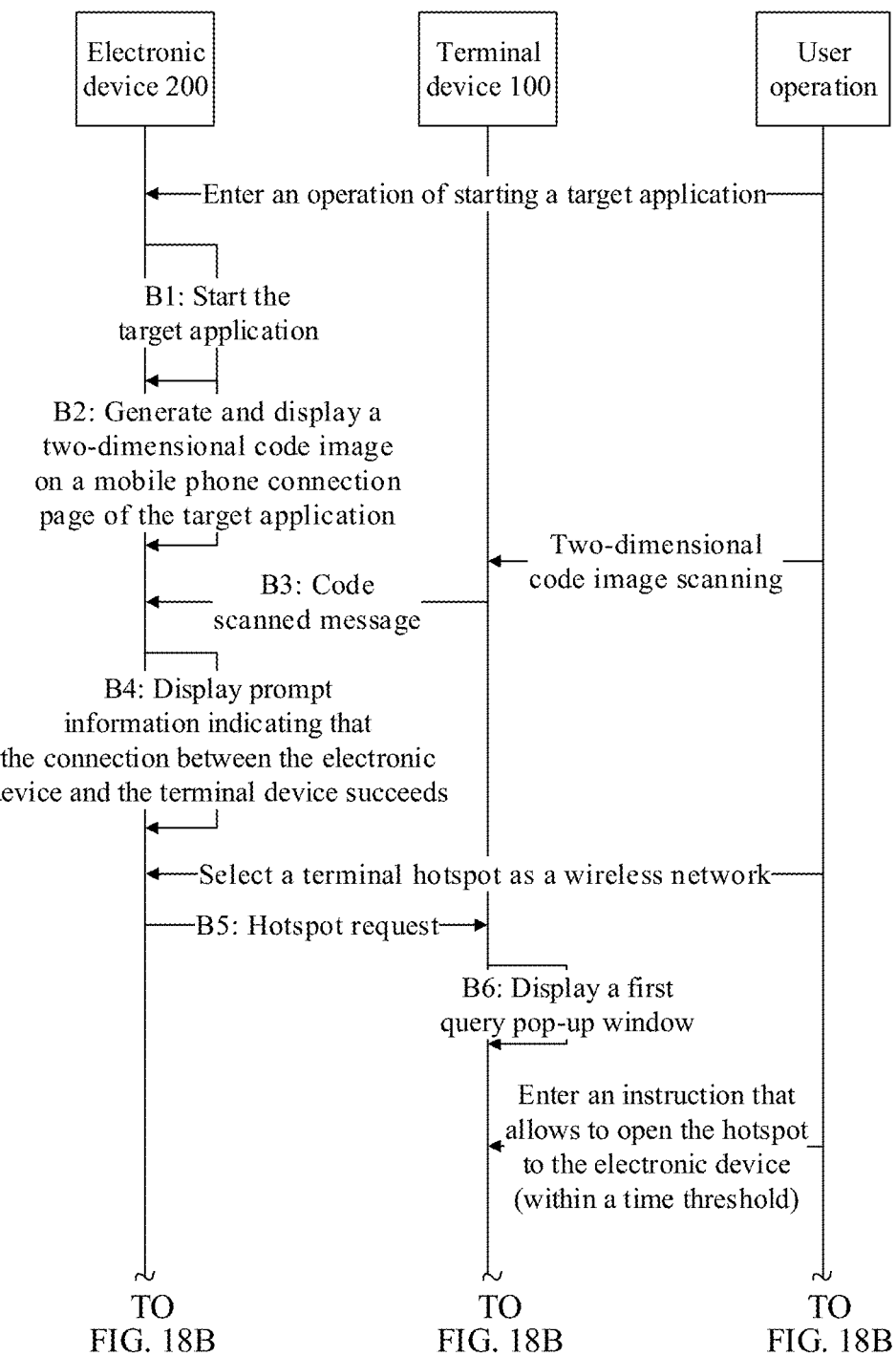
FIG. 18A and FIG. 18B are a diagram of an example of second signaling interaction between a terminal device and an electronic device.
Figure 18B:
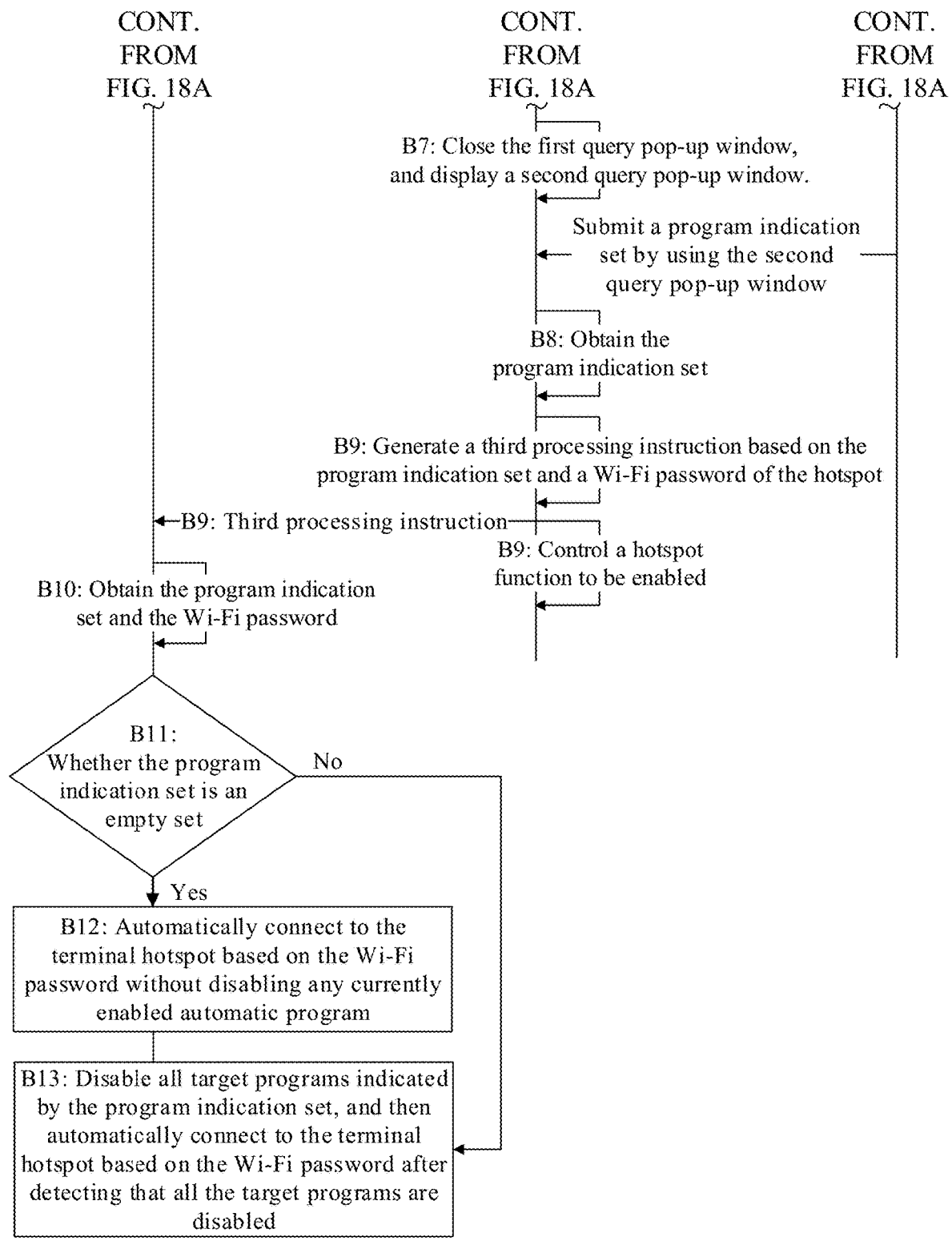

In some example implementations, FIG. 18A and FIG. 18B provide an example of second signaling interaction logic for performing a hotspot connection. Dual interaction ends include the terminal device 100 and the electronic device 200. An example in which the terminal device 100 and the electronic device 200 perform a code scanning connection and the electronic device determines whether a program indication set is an empty set is used. The signaling interaction logic includes the following program steps:

Step (B1): The end of the electronic device starts a target application when receiving a target application enabling operation entered by a user. The target application is an application that is installed on the electronic device and that has a function of connecting to the terminal device, for example, Computer Manager or Phone Assistant. A communications protocol for the code scanning connection is preset in a target application in the terminal device 100 and the electronic device 200, to subsequently implement the code scanning connection between the two-end devices.

Step (B2): The end of the electronic device generates and displays a two-dimensional code image on a mobile phone connection page of the target application.

Step (B3): The end of the terminal device sends a code scanned message to the electronic device when receiving an operation that the user scans the two-dimensional code image.

Step (B4): After receiving the code scanned message, the end of the electronic device displays prompt information indicating that the connection between the electronic device and the terminal device succeeds.

Step (B5): When receiving an operation that the user selects a terminal hotspot as a wireless network, the end of the electronic device sends a hotspot request to the terminal device. If the user does not enter the operation of selecting the terminal hotspot as a wireless network, it indicates that a user at the end of the electronic device does not use the terminal hotspot, and therefore does not send the hotspot request, and the terminal device 100 and the electronic device 200 each maintain a current state.

Step (B6): In response to the received hotspot request, the end of the terminal device display's a first query pop-up window.

Step (B7): When receiving, within a time threshold, an instruction that allows to open the hotspot to the electronic device and that is entered by the user by using the first query pop-up window, the end of the terminal device closes the first query pop-up window, and displays a second query pop-up window. If the user enters, only after the time threshold is exceeded, the instruction that allows to open the hotspot to the electronic device, or the user enters, by using the first query pop-up window, an instruction that does not allow to open the hotspot to the electronic device, the terminal device merely closes the first query pop-up window; and does not display the second query pop-up window.

Step (B8): The end of the terminal device obtains the program indication set submitted by the user by using the second query pop-up window. The program indication set is an empty set or a non-empty set. If the user taps a second acknowledgment control A without selecting any target program in the first type of second query pop-up window, or if the user finally taps a second cancel control A regardless of whether the user selects a target program, or if the user taps a second cancel control B in the second type of second query pop-up window, the program indication set is an empty set.

Step (B9): The end of the terminal device generates a third processing instruction based on the program indication set and the Wi-Fi password of the hotspot, sends the third processing instruction to the electronic device, and controls a hotspot function to be enabled.

Step (B10): After receiving the third processing instruction, the end of the electronic device obtains the program indication set and the Wi-Fi password.

Step (B11): The end of the electronic device determines whether the program indication set is an empty set; and if yes, performs step (B12); otherwise, performs step (B13).

Step (B12): The end of the electronic device automatically connects to the terminal hotspot based on the Wi-Fi password without disabling a currently enabled automatic program.

Step (B13): The end of the electronic device disables all target programs indicated by the program indication set, and then automatically connects to the terminal hotspot based on the Wi-Fi password after detecting that all the target programs are disabled.

Figure 19A:
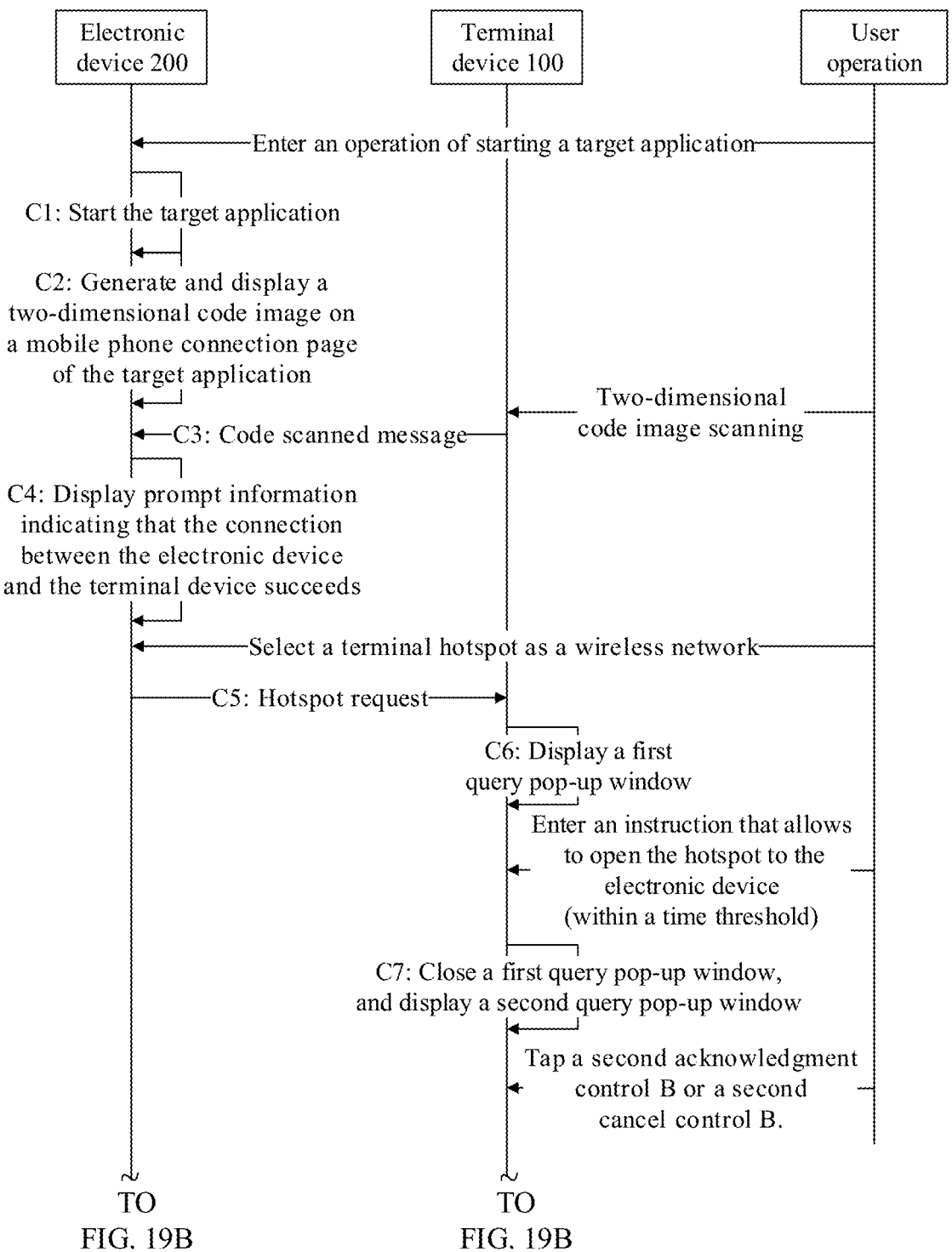
FIG. 19A and FIG. 19B are a diagram of an example of third signaling interaction between a terminal device and an electronic device.
Figure 19B:
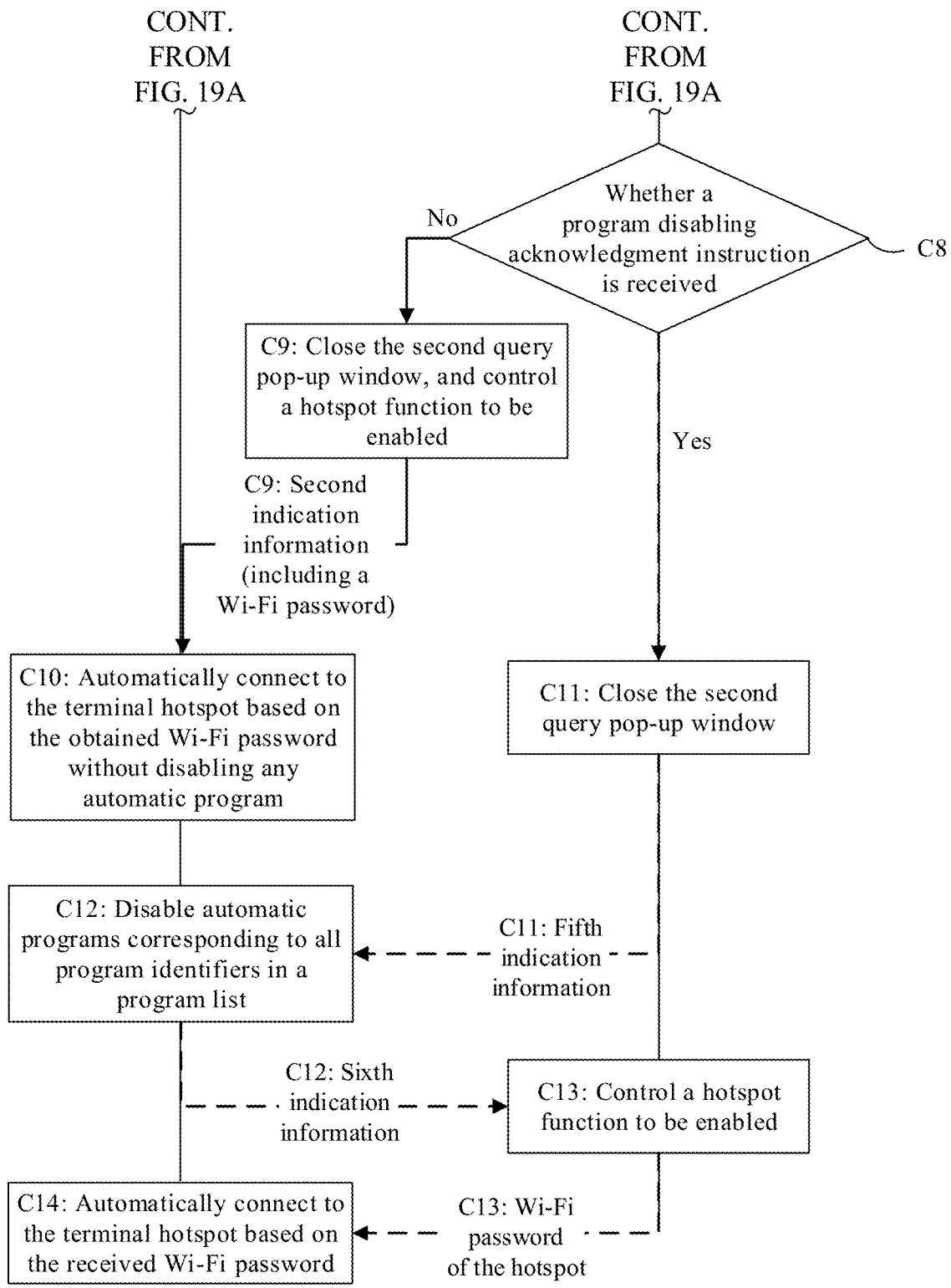

In some example implementations, FIG. 19A and FIG. 19B provide an example of third signaling interaction logic for performing a hotspot connection. Dual interaction ends include the terminal device 100 and the electronic device 200. An example in which the terminal device 100 and the electronic device 200 perform a code scanning connection and the terminal device determines whether a program indication set is an empty set is used, which corresponds to the second query pop-up window shown in FIG. 8. The signaling interaction logic includes the following program steps:

Step (C1): The end of the electronic device starts a target application when receiving a target application enabling operation entered by a user. The target application is an application that is installed on the electronic device and that has a function of connecting to a mobile phone, for example, Computer Manager or Phone Assistant. A communications protocol for the code scanning connection is preset in a target application in the terminal device 100 and the electronic device 200, to subsequently implement the code scanning connection between the two-end devices.

Step (C2): The end of the electronic device generates and displays a two-dimensional code image on a mobile phone connection page of the target application.

Step (C3): The end of the terminal device sends a code scanned message to the electronic device when receiving an operation that the user scans the two-dimensional code image.

Step (C4): After receiving the code scanned message, the end of the electronic device displays prompt information indicating that the connection between the electronic device and the terminal device succeeds.

Step (C5): When receiving an operation that the user selects a terminal hotspot as a wireless network, the end of the electronic device sends a hotspot request to the terminal device. If the user does not enter the operation of selecting the terminal hotspot as a wireless network, it indicates that a user at the end of the electronic device does not use the terminal hotspot, and therefore does not send the hotspot request, and the terminal device 100 and the electronic device 200 each maintain a current state.

Step (C6): In response to the received hotspot request, the end of the terminal device displays a first query pop-up window.

Step (C7): When receiving, within a time threshold, an instruction that allows to open the hotspot to the electronic device and that is entered by the user by using the first query pop-up window, the end of the terminal device closes the first query pop-up window, and displays a second query pop-up window. If the user enters, only after the time threshold is exceeded, the instruction that allows to open the hotspot to the electronic device, or the user enters, by using the first query pop-up window, an instruction that does not allow to open the hotspot to the electronic device, the terminal device merely closes the first query pop-up window; and does not display the second query pop-up window. Optionally, the second query pop-up window includes a second acknowledgment control B and a second cancel control B. If the user taps the second acknowledgment control B, the terminal device receives a program disabling acknowledgment instruction. If the user taps the second cancel control B, the terminal does not receive a program disabling acknowledgment instruction.

Step (C8): The end of the terminal device determines whether the program disabling acknowledgment instruction entered by the user in the second query pop-up window is received; and if no, step (C9) and step (C10) are performed; or if yes, step (C11) to step (C14) are performed.

Step (C9): The end of the terminal device closes the second query pop-up window, controls a hotspot function to be enabled, and sends a second indication message to the electronic device. Optionally, the second indication information carries a Wi-Fi password of the hotspot.

Step (C10): After receiving the second indication information, the end of the electronic device automatically connects to the terminal hotspot based on the obtained Wi-Fi password without disabling any automatic program. In other words, after the electronic device successfully accesses the hotspot, if an automatic program detects that the electronic device connects to the Wi-Fi network, the automatic program is allowed to automatically start execution.

Step (C11): The end of the terminal device closes the second query pop-up window, and sends fifth indication information to the electronic device.

Step (C12): After receiving the fifth indication information, the end of the electronic device disables automatic programs corresponding to all program identifiers in a program list, and then sends sixth indication information to the terminal device.

Step (C13): After receiving the sixth indication information, the end of the terminal device controls a hotspot function to be enabled, and sends a Wi-Fi password of the hotspot to the electronic device.

Step (C14): The end of the electronic device automatically connects to the terminal hotspot based on the received Wi-Fi password.

It should be noted that the communication interaction logic between the terminal device and the electronic device is not limited to the examples in FIG. 17A and FIG. 17B to FIG. 19A and FIG. 19B. During actual application, appropriate combinations, replacements, expansions, or modifications may be performed on a basis of the foregoing embodiments based on a plurality of factors such as a manner of connecting two-end devices, a query mode of a second query pop-up window, an execution body determining whether a program indication set is an empty set, and a specific use scenario, so as to obtain more implementation solutions and communication interaction logic that are more suitable for a hotspot access scenario. No enumeration is listed one by one in embodiments of this application.

Figure 20:
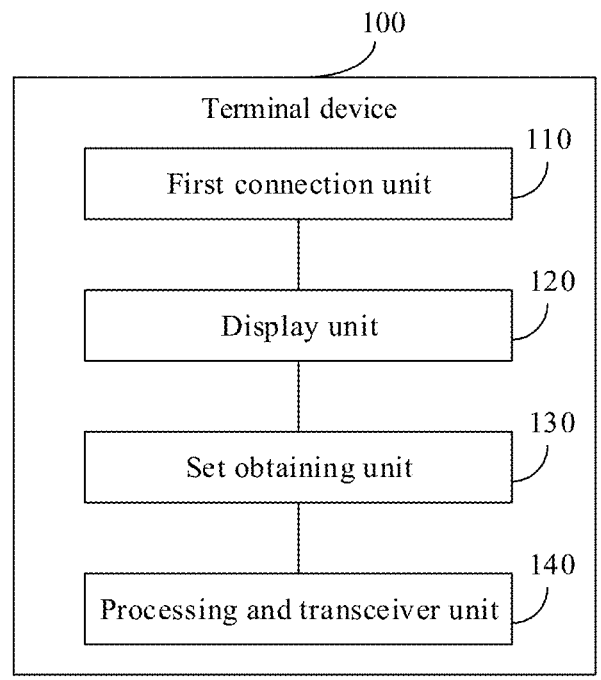
FIG. 20 is a schematic diagram of an example of a structure of a terminal device.

As shown in FIG. 20, an embodiment of this application provides a terminal device, including a first connection unit 110, a display unit 120, a set obtaining unit 130, and a processing and transceiver unit 140.

The first connection unit 110 is configured to establish a communication connection between the terminal device and an electronic device.

The display unit 120 is configured to: when the connection between the terminal device and the electronic device succeeds, display a first query pop-up window. The first query pop-up window is used to query a user whether to allow to open a hotspot to the electronic device.

The display unit 120 is further configured to: when receiving an instruction that allows to open the hotspot to the electronic device, close the first query pop-up window, and display a second query pop-up window. The second query pop-up window is used to query the user whether to disable an automatic program, and the automatic program is a program that is automatically executed by the electronic device in a network connected state.

The set obtaining unit 130 is configured to obtain a program indication set submitted by the user by using the second query pop-up window. A program indication in the program indication set is used to indicate, to the electronic device, a target program that is specified by the user to be disabled.

The processing and transceiver unit 140 is configured to send a processing instruction to the electronic device. The processing instruction is used to indicate the electronic device to connect to the hotspot after the electronic device disables all target programs indicated by the program indication set.

In an example implementation, the processing and transceiver unit 140 is specifically configured to: when detecting that the program indication set is a non-empty set, generate and send a first processing instruction to the electronic device based on the program indication set. The first processing instruction is used to indicate the electronic device to request to obtain a Wi-Fi password of the hotspot from the terminal device after the electronic device disables all the target programs indicated by the program indication set. Optionally, the processing and transceiver unit 140 is further configured to: receive program disabled information that is sent by the electronic device in response to the first processing instruction; control enabling of a hotspot function; and send the Wi-Fi password of the hotspot to the electronic device, so that the electronic device connects to the hotspot.

In an example implementation, the processing and transceiver unit 140 is specifically configured to: when detecting that the program indication set is an empty set, send a second processing instruction to the electronic device. The second processing instruction carries a Wi-Fi password of the hotspot, and the second processing instruction is used to indicate the electronic device to not disable any automatic program and to automatically connect to the hotspot by using the Wi-Fi password. Optionally, the processing and transceiver unit 140 is further configured to: after sending the second processing instruction to the electronic device, control enabling of a hotspot function.

In an example implementation, the processing and transceiver unit 140 is specifically configured to generate a third processing instruction based on the program indication set and a Wi-Fi password of the hotspot. The third processing instruction is specifically used to indicate the electronic device to detect whether the program indication set is an empty set, and execute corresponding processing logic based on a detection result. In response to the third processing instruction, if the electronic device detects that the program indication set is a non-empty set, the electronic device first disables all the target programs indicated by the program indication set, and then connects to the hotspot based on the Wi-Fi password. If the electronic device detects that the program indication set is an empty set, the electronic device directly connects to the hotspot based on the Wi-Fi password. Optionally, the processing and transceiver unit

140 is further configured to: after sending the third processing instruction to the electronic device, control enabling of a hotspot function.

In an example implementation, the processing and transceiver unit 140 is further configured to: before the display unit 120 displays the second query pop-up window, send first indication information to the electronic device, where the first indication information is used to indicate the electronic device to feed back a program list, and the program list includes program identifiers of all automatic programs that each are in an enabled state currently in the electronic device; receive the program list from the electronic device; and generate the second query pop-up window based on the program list, where the second query pop-up window is used to enable the user to select no target program or select at least one target program from the program list, so that the program indication set obtained by the terminal device is an empty set or is a non-empty subset of the program list.

In an example implementation, the display unit 120 is further configured to display, in the second query pop-up window, information used to query the user whether to disable all automatic programs that each are in an enabled state currently in the electronic device, an acknowledgment control, and a cancel control. The acknowledgment control is configured to enable the program indication set obtained by the terminal device to be a universal set of a program list when being triggered, the program list includes program identifiers of all the automatic programs that each are in an enabled state currently in the electronic device, and the cancel control is configured to enable the program indication set obtained by the terminal device to be an empty set when being triggered.

In an example implementation, the display unit 120 is further configured to: after displaying the first query pop-up window; if the terminal device does not receive, within a time threshold, the instruction that allows to open the hotspot to the electronic device, close only the first query pop-up window, and skip displaying the second query pop-up window.

The terminal device 100 corresponds to the hotspot connection method performed by the terminal device according to the foregoing method embodiment, and specific implementation of each unit/module in the terminal device 100 is based on a same concept as the foregoing method embodiment. Therefore, for function configuration of each unit/module in the terminal device 100, refer to the descriptions of the hotspot connection method performed by the terminal device in the foregoing method embodiment. Details are not described herein again.

Figure 21:
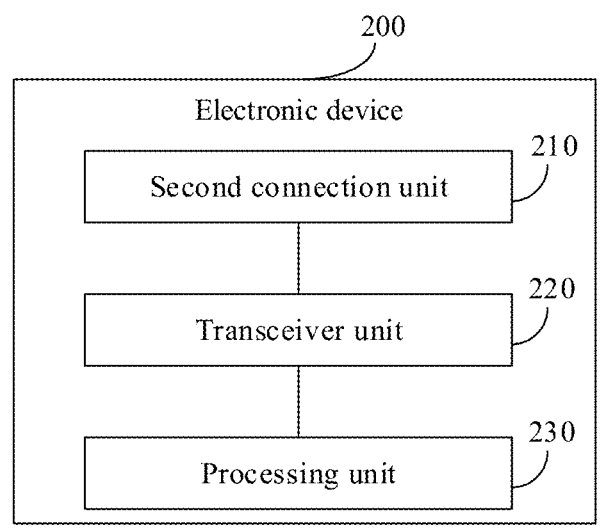
FIG. 21 is a schematic diagram of an example of a structure of an electronic device.

As shown in FIG. 21, an embodiment of this application provides an electronic device, including a second connection unit 210, a transceiver unit 220, and a processing unit 230.

The second connection unit 210 is configured to establish a communication connection between the electronic device and a terminal device.

The transceiver unit 220 is configured to: after the connection between the electronic device and the terminal device succeeds, receive a processing instruction from the terminal device.

The processing unit 230 is configured to identify a category of the processing instruction.

The processing unit 230 is further configured to: if the processing unit identifies that the processing instruction belongs to a target category, in response to the processing instruction, disable all target programs indicated by a program indication set in the processing instruction, and then connect to a hotspot. The processing instruction of the target category includes the program indication set, a program indication in the program indication set is used to indicate a target program to the electronic device, the target program is an automatic program that is specified by a terminal user to be disabled, and the automatic program is a program that is automatically executed by the electronic device in a network connected state.

In an example implementation, the processing unit 230 is specifically configured to: if the processing unit identifies that the processing instruction is a first processing instruction (belonging to the target category), disable all the target programs indicated by the program indication set; send program disabled information to the terminal device, where the program disabled information is used to notify the terminal device that all the target programs are disabled, and request a Wi-Fi password of the hotspot; and receive the Wi-Fi password from the terminal device, and automatically connect to the hotspot by using the Wi-Fi password. The first processing instruction is a processing instruction that is sent by the terminal device when the terminal device receives an instruction that allows to open the hotspot to the electronic device, obtains the program indication set submitted by the terminal user, and detects that the program indication set is a non-empty set.

In an example implementation, the processing unit 230 is specifically configured to: if the processing unit identifies that the processing instruction is a third processing instruction (belonging to the target category), detect whether the program indication set is an empty set, where the third processing instruction further includes a Wi-Fi password of the hotspot; and if the processing unit detects that the program indication set is a non-empty set, disable all the target programs indicated by the program indication set, and then automatically connect to the hotspot by using the Wi-Fi password; or if the processing unit detects that the program indication set is an empty set, automatically connect to the hotspot by using the Wi-Fi password, and skip disabling any automatic program.

In an example implementation, the processing unit 230 is further configured to: if the processing unit identifies that the processing instruction is a second processing instruction of a non-target category, automatically connect to the hotspot based on a Wi-Fi password carried in the second processing instruction, and skip disabling any automatic program. The second processing instruction is a processing instruction that is sent by the terminal device when the terminal device receives an instruction that allows to open the hotspot to the electronic device, obtains the program indication set submitted by the terminal user, and detects that the program indication set is an empty set.

In an example implementation, the transceiver unit 220 is further configured to: before receiving the processing instruction from the terminal device, when receiving first indication information from the terminal device, send an obtained program list to the terminal device. The program list includes program identifiers of all automatic programs that each are in an enabled state currently in the electronic device, and the program list is used to enable the terminal user to select the target program.

The electronic device 200 corresponds to the hotspot connection method performed by the electronic device according to the foregoing method embodiment, and specific implementation of each unit/module in the electronic device 200 is based on a same concept as the foregoing method embodiment. Therefore, for function configuration of each unit/module in the electronic device 200, refer to the descriptions of the hotspot connection method performed by the electronic device in the foregoing method embodiment. Details are not described herein again.

It should be noted that the terminal device 100 and the electronic device 200 may set, based on the hotspot connection methods performed by respective ends, corresponding units/modules for the program steps in the methods. A corresponding unit/module may be set for each step, or units/modules having a same or similar function may be integrated, or units/modules may be further refined into subunits/submodules according to the steps, or the like. The foregoing units/modules may be implemented in a form of hardware, or may be implemented in a form of a software function unit. Unit/module configuration of the terminal device 100 and the electronic device 200 is not limited to embodiments of this application.

This application provides an embodiment of another terminal device. The terminal device includes a memory and at least one processor. The memory is configured to store instructions. The at least one processor is configured to execute the instructions in the memory to perform the hotspot connection method performed by the end of the terminal device in the foregoing embodiment.

This application provides an embodiment of another electronic device. The electronic device includes a memory and at least one processor. The memory is configured to store instructions. The at least one processor is configured to execute the instructions in the memory to perform the hotspot connection method performed by the end of the electronic device in the foregoing embodiment.

An embodiment of this application further provides a chip system. The chip system includes a processor and a memory. The memory stores program instructions. When the program instructions are executed by the processor, the chip system is enabled to perform the hotspot connection method performed by the end of the terminal device in the foregoing embodiment, for example, generate or process information involved in the foregoing method.

An embodiment of this application further provides a chip system. The chip system includes a processor and a memory. The memory stores program instructions. When the program instructions are executed by the processor, the chip system is enabled to perform the hotspot connection method performed by the end of the electronic device in the foregoing embodiment, for example, generate or process information involved in the foregoing method.

This application further provides a computer program product including instructions. When the computer program product runs on a computer, the computer is enabled to perform the hotspot connection method performed by the end of the terminal device in the foregoing embodiment.

This application further provides a computer program product including instructions. When the computer program product runs on a computer, the computer is enabled to perform the hotspot connection method performed by the end of the electronic device in the foregoing embodiment.

An embodiment of this application further provides a computer storage medium. The computer-readable storage medium stores program instructions. When the program instructions are run on a computer, the computer is enabled to perform the hotspot connection method performed by the end of the terminal device in the foregoing embodiment.

An embodiment of this application further provides a computer storage medium. The computer-readable storage medium stores program instructions. When the program instructions are run on a computer, the computer is enabled to perform the hotspot connection method performed by the end of the electronic device in the foregoing embodiment.

A person skilled in the art may clearly understand that the technology in embodiments of the present disclosure may be implemented by software in addition to a required universal hardware platform. In some embodiments, the present disclosure further provides a computer storage medium. The computer storage medium may store a program. When the computer storage medium is located in a terminal device or an electronic device, program execution may include some or all program steps involved in the hotspot connection method performed by the terminal device or the electronic device. The computer storage medium may be a magnetic disk, an optical disc, a read-only memory (ROM), a random access memory (RAM), or the like.

Finally, it should be noted that the examples of the foregoing implementations are merely used to describe the technical solutions of this application, but are not used to limit the technical solutions. Although this application is described in detail with reference to embodiments, a person of ordinary skill in the art should understand that embodiments may still modify the technical solutions described in embodiments, or perform equivalent replacement on some or all of the technical features. However, these modifications or replacements do not leave the essence of the corresponding technical solutions out of the scope of the technical solutions in embodiments of this application.

For ease of explanation, the foregoing descriptions are provided with reference to specific implementations. However, the foregoing example discussion is not intended to be exhaustive or limit an implementation to the foregoing disclosed specific form. According to the foregoing descriptions, various modifications and variations may be obtained. The foregoing implementations are selected and described for a better principle explanation and an actual application, so that a person skilled in the art better uses the implementations and various implementation variations that are applicable to specific usage considerations.

What is claimed is:

1. A hotspot connection method, comprising:
    establishing, by a terminal device, a communication connection to an electronic device;
    displaying, by the terminal device, a first query pop-up window in response to the connection to the electronic device succeeding, wherein the first query pop-up window is used to query a user whether to allow to open a hotspot to the electronic device;
    closing, by the terminal device, the first query pop-up window, and displaying a second query pop-up window in response to receiving an instruction that allows to open the hotspot to the electronic device, wherein the second query pop-up window is used to query the user whether to disable an automatic program, and wherein the automatic program is a program that is automatically executed by the electronic device in a network connected state;
    obtaining, by the terminal device, a program indication set submitted by the user by using the second query pop-up window, wherein a program indication in the program indication set is used to indicate, to the electronic device, a target program that is specified by the user to be disabled; and
    sending, by the terminal device, a processing instruction to the electronic device, wherein the processing instruction is used to indicate the electronic device to connect to the hotspot after the electronic device disables all target programs indicated by the program indication set;

wherein before the displaying, by the terminal device, the second query pop-up window, the method further comprises:
  sending, by the terminal device, first indication information to the electronic device, wherein the first indication information is used to indicate the electronic device to feed back a program list, and wherein the program list comprises program identifiers of all automatic programs that each are in an enabled state currently in the electronic device;
  receiving, by the terminal device, the program list from the electronic device; and
  generating, by the terminal device, the second query pop-up window based on the program list, wherein the second query pop-up window is used to enable the user to select no target program or select at least one target program from the program list, so that the program indication set obtained by the terminal device is an empty set or is a non-empty subset of the program list;
wherein the second query pop-up window displays query information, an acknowledgment control, and a cancel control; and
wherein the query information is used to query the user whether to disable all automatic programs that each are in an enabled state currently in the electronic device, the acknowledgment control is configured to enable the program indication set obtained by the terminal device to be a universal set of a program list when being triggered, and the cancel control is configured to enable the program indication set obtained by the terminal device to be the empty set when being triggered.

2. The method of claim 1, wherein the sending, by the terminal device, the processing instruction to the electronic device comprises:
  generating and sending, by the terminal device, a first processing instruction to the electronic device based on the program indication set in response to detecting that the program indication set is a non-empty set, wherein the first processing instruction is used to indicate the electronic device to request to obtain a Wi-Fi password of the hotspot from the terminal device after the electronic device disables all the target programs indicated by the program indication set.

3. The method according to claim 1, wherein the sending, by the terminal device, the processing instruction to the electronic device comprises:
  sending, by the terminal device, a second processing instruction to the electronic device in response to detecting that the program indication set is the empty set, wherein the second processing instruction carries a Wi-Fi password of the hotspot, and wherein the second processing instruction is used to indicate the electronic device to automatically connect to the hotspot by using the Wi-Fi password.

4. The method of claim 1, wherein the sending, by the terminal device, the processing instruction to the electronic device comprises:
  sending a third processing instruction to the electronic device, wherein the third processing instruction carries a Wi-Fi password of the hotspot and the program indication set, and wherein the third processing instruction is used to indicate the electronic device to automatically connect to the hotspot based on the Wi-Fi password after the electronic device disables all the target programs indicated by the program indication set.

5. The method of claim 2, further comprising:
  receiving, by the terminal device, program disabled information from the electronic device in response to the first processing instruction;
  controlling, by the terminal device, enabling of a hotspot function; and
  sending, by the terminal device, the Wi-Fi password of the hotspot to the electronic device, so that the electronic device connects to the hotspot.

6. The method of claim 3, further comprising:
  controlling, by the terminal device, enabling of a hotspot function after sending the processing instruction to the electronic device.

7. The method of claim 1, wherein after the displaying, by the terminal device, the first query pop-up window, the method further comprises:
  in response to the terminal device not receiving, within a time threshold, the instruction that allows to open the hotspot to the electronic device, closing, by the terminal device, only the first query pop-up window; and
  skipping displaying the second query pop-up window.

8. A terminal device, comprising:
  one or more processors; and
  one or more storage devices storing instructions that are operable, when executed by the one or more processors, to cause the one or more processors to perform operations comprising:
    establishing, by a terminal device, a communication connection to an electronic device;
    displaying, by the terminal device, a first query pop-up window in response to the connection to the electronic device succeeding, wherein the first query pop-up window is used to query a user whether to allow to open a hotspot to the electronic device;
    closing, by the terminal device, the first query pop-up window, and displaying a second query pop-up window in response to receiving an instruction that allows to open the hotspot to the electronic device, wherein the second query pop-up window is used to query the user whether to disable an automatic program, and wherein the automatic program is a program that is automatically executed by the electronic device in a network connected state;
    obtaining, by the terminal device, a program indication set submitted by the user by using the second query pop-up window, wherein a program indication in the program indication set is used to indicate, to the electronic device, a target program that is specified by the user to be disabled; and
    sending, by the terminal device, a processing instruction to the electronic device, wherein the processing instruction is used to indicate the electronic device to connect to the hotspot after the electronic device disables all target programs indicated by the program indication set;
  wherein before the displaying, by the terminal device, the second query pop-up window, the operations further comprise:
    sending, by the terminal device, first indication information to the electronic device, wherein the first indication information is used to indicate the electronic device to feed back a program list, and wherein the program list comprises program identifiers of all automatic programs that each are in an enabled state currently in the electronic device;
    receiving, by the terminal device, the program list from the electronic device; and generating, by the terminal device, the second query pop-up window based on the program list, wherein the second query pop-up window is used to enable the user to select no target program or select at least one target program from the program list, so that the program indication set obtained by the terminal device is an empty set or is a non-empty subset of the program list;

wherein the second query pop-up window displays query information, an acknowledgment control, and a cancel control; and wherein the query information is used to query the user whether to disable all automatic programs that each are in an enabled state currently in the electronic device, the acknowledgment control is configured to enable the program indication set obtained by the terminal device to be a universal set of a program list when being triggered, and the cancel control is configured to enable the program indication set obtained by the terminal device to be the empty set when being triggered.

9. The terminal device of claim 8, wherein the sending, by the terminal device, the processing instruction to the electronic device comprises:

generating and sending, by the terminal device, a first processing instruction to the electronic device based on the program indication set in response to detecting that the program indication set is a non-empty set, wherein the first processing instruction is used to indicate the electronic device to request to obtain a Wi-Fi password of the hotspot from the terminal device after the electronic device disables all the target programs indicated by the program indication set.

10. The terminal device of claim 8, wherein the sending, by the terminal device, the processing instruction to the electronic device comprises:

sending, by the terminal device, a second processing instruction to the electronic device in response to detecting that the program indication set is the empty set, wherein the second processing instruction carries a Wi-Fi password of the hotspot, and wherein the second processing instruction is used to indicate the electronic device to automatically connect to the hotspot by using the Wi-Fi password.

11. The terminal device of claim 8, wherein the sending, by the terminal device, the processing instruction to the electronic device comprises:

sending a third processing instruction to the electronic device, wherein the third processing instruction carries a Wi-Fi password of the hotspot and the program indication set, and wherein the third processing instruction is used to indicate the electronic device to automatically connect to the hotspot based on the Wi-Fi password after the electronic device disables all the target programs indicated by the program indication set.

12. A non-transitory computer-readable storage medium storing instructions that, when executed by a processor, cause a terminal device to perform a hotspot connection method comprising:

establishing, by the terminal device, a communication connection to an electronic device;

displaying, by the terminal device, a first query pop-up window in response to the connection to the electronic device succeeding, wherein the first query pop-up window is used to query a user whether to allow to open a hotspot to the electronic device;

closing, by the terminal device, the first query pop-up window, and displaying a second query pop-up window in response to receiving an instruction that allows to open the hotspot to the electronic device, wherein the second query pop-up window is used to query the user whether to disable an automatic program, and wherein the automatic program is a program that is automatically executed by the electronic device in a network connected state;

obtaining, by the terminal device, a program indication set submitted by the user by using the second query pop-up window, wherein a program indication in the program indication set is used to indicate, to the electronic device, a target program that is specified by the user to be disabled; and sending, by the terminal device, a processing instruction to the electronic device, wherein the processing instruction is used to indicate the electronic device to connect to the hotspot after the electronic device disables all target programs indicated by the program indication set;

wherein before the displaying, by the terminal device, the second query pop-up window, the method further comprises:

sending, by the terminal device, first indication information to the electronic device, wherein the first indication information is used to indicate the electronic device to feed back a program list, and wherein the program list comprises program identifiers of all automatic programs that each are in an enabled state currently in the electronic device;

receiving, by the terminal device, the program list from the electronic device; and generating, by the terminal device, the second query pop-up window based on the program list, wherein the second query pop-up window is used to enable the user to select no target program or select at least one target program from the program list, so that the program indication set obtained by the terminal device is an empty set or is a non-empty subset of the program list;

wherein the second query pop-up window displays query information, an acknowledgment control, and a cancel control; and wherein the query information is used to query the user whether to disable all automatic programs that each are in an enabled state currently in the electronic device, the acknowledgment control is configured to enable the program indication set obtained by the terminal device to be a universal set of a program list when being triggered, and the cancel control is configured to enable the program indication set obtained by the terminal device to be the empty set when being triggered.

13. The computer-readable storage medium of claim 12, wherein the sending, by the terminal device, the processing instruction to the electronic device comprises:

generating and sending, by the terminal device, a first processing instruction to the electronic device based on the program indication set in response to detecting that the program indication set is a non-empty set, wherein the first processing instruction is used to indicate the electronic device to request to obtain a Wi-Fi password of the hotspot from the terminal device after the electronic device disables all the target programs indicated by the program indication set.

14. The computer-readable storage medium according to claim 12, wherein the sending, by the terminal device, the processing instruction to the electronic device comprises:
   sending, by the terminal device, a second processing instruction to the electronic device in response to detecting that the program indication set is the empty set, wherein the second processing instruction carries a Wi-Fi password of the hotspot, and wherein the second processing instruction is used to indicate the electronic device to automatically connect to the hotspot by using the Wi-Fi password.

15. The computer-readable storage medium of claim 12, wherein the sending, by the terminal device, the processing instruction to the electronic device comprises:
   sending a third processing instruction to the electronic device, wherein the third processing instruction carries a Wi-Fi password of the hotspot and the program indication set, and wherein the third processing instruction is used to indicate the electronic device to automatically connect to the hotspot based on the Wi-Fi password after the electronic device disables all the target programs indicated by the program indication set.

16. The computer-readable storage medium of claim 13, further comprising:
   receiving, by the terminal device, program disabled information from the electronic device in response to the first processing instruction;
   controlling, by the terminal device, enabling of a hotspot function; and
   sending, by the terminal device, the Wi-Fi password of the hotspot to the electronic device, so that the electronic device connects to the hotspot.

17. The computer-readable storage medium of claim 14, further comprising:
   controlling, by the terminal device, enabling of a hotspot function after sending the processing instruction to the electronic device.

18. The computer-readable storage medium of claim 12, wherein after the displaying, by the terminal device, the first query pop-up window, the method further comprises:
   in response to the terminal device not receiving, within a time threshold, the instruction that allows to open the hotspot to the electronic device, closing, by the terminal device, only the first query pop-up window; and
   skipping displaying the second query pop-up window.

* * * * *